(12) United States Patent
Ikoshi et al.

(10) Patent No.: US 7,918,927 B2
(45) Date of Patent: Apr. 5, 2011

(54) INKJET RECORDING LIQUID AND INKJET RECORDING METHOD

(75) Inventors: Masao Ikoshi, Ashigarakami-gun (JP); Yoshimitsu Arai, Ashigarakami-gun (JP); Koji Furukawa, Ashigarakami-gun (JP); Katsuyuki Hirato, Ashigarakami-gun (JP); Kaoru Tojo, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/369,424

(22) Filed: Feb. 11, 2009

(65) Prior Publication Data

US 2009/0202723 A1  Aug. 13, 2009

(30) Foreign Application Priority Data

Feb. 13, 2008 (JP) ................................ 2008-032167
Jan. 15, 2009 (JP) ................................ 2009-006732

(51) Int. Cl.
C09D 11/02 (2006.01)
(52) U.S. Cl. .................. 106/31.58; 106/31.86
(58) Field of Classification Search .............. 106/31.58, 106/31.86
See application file for complete search history.

(56) References Cited

U.S. PATENT DOCUMENTS 6,261,350 B1 * 7/2001 Kabalnov ................. 106/31.33
7,264,664 B2 * 9/2007 Kamoto et al. ............ 106/31.59
7,300,508 B2 * 11/2007 Hiroki et al. ............... 106/31.86
2001/0023266 A1 * 9/2001 Miyabayashi ............. 523/161
2002/0198287 A1 * 12/2002 Ohta et al. ................ 523/160

FOREIGN PATENT DOCUMENTS

| JP | 9-176538 A | 7/1997 |
| JP | 2004-209762 A | 7/2004 |
| JP | 2007-152873 A | 6/2007 |

* cited by examiner

*Primary Examiner* — Jerry Lorengo
*Assistant Examiner* — Veronica Faison Gee
(74) *Attorney, Agent, or Firm* — Sughrue Mion, PLLC

(57) ABSTRACT

An inkjet recording liquid includes: water; a colorant; a first water-soluble organic solvent having a structure represented by the following Formula (1), an SP value of 27.5 or less, and a molecular weight of 100 to 210; and a second water-soluble organic solvent having a structure represented by the following Formula (2), an SP value of 27.5 or less, and a molecular weight of 240 to 2000, wherein the mass ratio of the content of the first water-soluble organic solvent to the content of the second water-soluble organic solvent is from 1:3 to 3:1:

$$R^1\text{-}(A^1)_n\text{-}OH \qquad \text{Formula (1)}$$

$$R^2\text{-}(A^2)_m\text{-}OH \qquad \text{Formula (2)}$$

In Formulae (1) and (2), $R^1$ represents a hydrogen atom or an alkyl group, $R^2$ represents a hydrogen atom, an alkyl group, or a group derived from a sugar alcohol, each $A^1$ independently represents an ethyleneoxy group or a propyleneoxy group, each $A^2$ independently represents an ethyleneoxy group or a propyleneoxy group, n represents an integer from 1 to 3 and m represents an integer from 3 to 40.

12 Claims, No Drawings

INKJET RECORDING LIQUID AND INKJET RECORDING METHOD

CROSS-REFERENCE TO RELATED APPLICATIONS

This application claims priorities under 35 USC 119 from Japanese Patent Application No. 2008-032167 filed on Feb. 13, 2008 and Japanese Patent Application No. 2009-006732 filed on Jan. 15, 2009, the disclosures of which are incorporated by reference herein.

BACKGROUND OF THE INVENTION

1. Field of Invention

The invention relates to an inkjet recording liquid and an inkjet recording method.

2. Description of the Related Art

An inkjet recording method is a method for recording by jetting ink droplets from each of many nozzles formed at an inkjet head, and this method has been widely utilized because of the low level of noise generated during a recording operation, because running costs are inexpensive and because a high-quality image may be recorded on various recording media.

Although various kinds of recording media for inkjet recording are available, such as plain paper, coated paper, glossy paper, OHP sheets, or back print film, low-price plain paper is usually used for business applications in a normal office environment. Examples of required properties in such an environment include reduction or suppression of a curling (warping or rounding of paper) phenomenon caused when a large amount of ink is provided onto the paper, as well as satisfaction of ordinary requirements. It is important to reduce or suppress both curl during recording and curl caused by drying or evaporating of moisture after recording.

As methods for reducing or suppressing the occurrence of curling, several methods have been proposed. For example, a printing method in which droplet size per drop and printing amount per unit area are controlled by using an ink containing a polyhydric alcohol having a specific molecular weight and a water-soluble amide compound is known (see, for example, Japanese Patent Application Laid-Open (JP-A) No. 2004-209762).

Further, a method for suppressing curl by using a water-based ink containing a solvent having low polarity in an amount of 30% or more with respect to the total weight of the ink is known (see, for example, JP-A No. 2007-152873).

Furthermore, ink containing a specific amide compound as an anti-curling agent has been proposed (see, for example, JP-A No. 9-176538).

SUMMARY OF THE INVENTION

However, in the method disclosed in JP-A No. 2004-209762, there have been problems with respect to practical use since the printing method is greatly restricted. Furthermore, in the ink disclosed in JP-A No. 2007-152873, the storage stability of the ink is insufficient. In addition, in the ink disclosed in JP-A No. 9-176538, ink jetting property tends to deteriorate.

An object of the invention is to provide an inkjet recording liquid having excellent storage stability and jetting stability, and which can suppress the occurrence of curling, and an inkjet recording method using the same.

Aspects of the invention include those described below.

<1> An inkjet recording liquid including water; a colorant; a first water-soluble organic solvent having a structure represented by the following Formula (1), an SP value of 27.5 or less, and a molecular weight of 100 to 210; and a second water-soluble organic solvent having a structure represented by the following Formula (2), an SP value of 27.5 or less, and a molecular weight of 240 to 2000, wherein the mass ratio of the content of the first water-soluble organic solvent to the content of the second water-soluble organic solvent is from 1:3 to 3:1.

$$R^1\text{-}(A^1)_n\text{-}OH \quad \text{Formula (1)}$$

$$R^2\text{-}(A^2)_m\text{-}OH \quad \text{Formula (2)}$$

In Formula (1), $R^1$ represents a hydrogen atom or an alkyl group having 1 to 4 carbon atoms, each $A^1$ independently represents an ethyleneoxy group or a propyleneoxy group, and n represents an integer from 1 to 3. In Formula (2), $R^2$ represents a hydrogen atom, an alkyl group having 1 to 4 carbon atoms, or a group derived from a sugar alcohol having 3 to 12 carbon atoms, each $A^2$ independently represents an ethyleneoxy group or a propyleneoxy group, and m represents an integer from 3 to 40.

<2> The inkjet recording liquid according to <1>, wherein the first water-soluble organic solvent is at least one selected from propyleneglycol monoethyl ether, diethyleneglycol monoethyl ether, diethyleneglycol monobutyl ether, triethyleneglycol monobutyl ether, dipropyleneglycol, dipropyleneglycol monomethyl ether, or tripropyleneglycol monomethylether, and the second water-soluble organic solvent is at least one selected from a polyoxypropylene glyceryl ether having 3 to 9 propyleneoxy groups or a polyoxyethylene polyoxypropylene butyl ether in which the total number of ethyleneoxy groups and propyleneoxy groups is from 3 to 20.

<3> The inkjet recording liquid according to <1> or <2>, wherein the total content of the first and second water-soluble organic solvents is from 5 to 30 mass % with respect to the total mass of the inkjet recording liquid.

<4> The inkjet recording liquid according to any one of <1> to <3> wherein the total content of water-soluble organic solvent having an SP value of 27.5 or less is 70 mass % or more with respect to the total mass of water-soluble organic solvent.

<5> The inkjet recording liquid according to any one of <1> to <4>, wherein the total content of the first and second water-soluble organic solvents is 90 mass % or more with respect to the total mass of water-soluble organic solvent.

<6> The inkjet recording liquid according to any one of <1> to <5>, further comprising a third water-soluble organic solvent.

<7> The inkjet recording liquid according to any one of <1> to <6>, wherein the content of the colorant is from 0.1 to 15 mass % with respect to the total mass of the inkjet recording liquid.

<8> The inkjet recording liquid according to any one of <1> to <7>, wherein the colorant is a pigment dispersed by a phase inversion emulsification method.

<9> The inkjet recording liquid according to any one of <1> to <8>, further comprising a resin particle.

<10> The inkjet recording liquid according to <9>, wherein the content of the solid component of the resin particle is from 0.5 to 20 mass % with respect to the total mass of the inkjet recording liquid.

<11> An inkjet recording method, including jetting the inkjet recording liquid according to any one of <1> to <10> onto a recording medium to form an image.

<12> The inkjet recording method according to <11>, further including applying a printability-improving liquid composition onto a recording medium.

<13> The inkjet recording method according to <12>, wherein the printability-improving liquid composition includes a multivalent metal salt.

<14> The inkjet recording method according to any one of <11> to <13>, wherein the recording medium is plain paper or coated paper.

DETAILED DESCRIPTION OF THE INVENTION

Inkjet Recording Liquid

The inkjet recording liquid of the invention (hereinafter, sometimes referred to as simply an "ink") includes water; a colorant; a first water-soluble organic solvent having a structure represented by the following Formula (1), an SP value of 27.5 or less, and a molecular weight of 100 to 210; and a second water-soluble organic solvent having a structure represented by the following Formula (2), an SP value of 27.5 or less, and a molecular weight of 240 to 2000, wherein the mass ratio of the content of the first water-soluble organic solvent to the content of the second water-soluble organic solvent is from 1:3 to 3:1.

The recording liquid of the invention containing the first and second water-soluble organic solvents at the above specific ratio can suppress the occurrence of curling even when an image is recorded on plain paper or general-purpose coated paper other than specialized inkjet paper with an inkjet system. In addition, the recording liquid of the invention is excellent in storage stability and jetting stability.

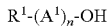  Formula (1)

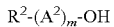  Formula (2)

$R^1\text{-}(A^1)_n\text{-}OH$      Formula (1)

$R^2\text{-}(A^2)_m\text{-}OH$      Formula (2)

In Formulae (1) and (2), $R^1$ represents a hydrogen atom or an alkyl group having 1 to 4 carbon atoms, each $A^1$ independently represents an ethyleneoxy group or a propyleneoxy group, and n represents an integer from 1 to 3. $R^2$ represents a hydrogen atom, an alkyl group having 1 to 4 carbon atoms or a group derived from a sugar alcohol having 3 to 12 carbon atoms, each $A^2$ independently represents an ethyleneoxy group or a propyleneoxy group, and m represents an integer from 3 to 40.

In addition to the above essential components, the inkjet recording liquid of the invention may contain a surfactant, a resin particle or another component, if needed.

The inkjet recording liquid of the invention can be used for a full color image formation. The inkjet recording liquid may be used as at least one of, or each of, the inks for forming a full color image. In order to form a full color image, a magenta color ink, a cyan color ink, and a yellow color ink can be used. In order to adjust a color tone, a black color ink may be used additionally. Other than yellow, magenta, and cyan color inks, at least one of a red ink, a green ink, a blue ink, a white ink, or an ink having a special color used in the field of printing may be used.

Water-Soluble Organic Solvent

The inkjet recording liquid of the invention includes at least one first water-soluble organic solvent having a structure represented by Formula (1), an SP value of 27.5 or less, and a molecular weight of 100 to 210, and at least one second water-soluble organic solvent having a structure represented by Formula (2), an SP value of 27.5 or less, and a molecular weight of 240 to 2000.

Here, the "water-soluble organic solvent" in the invention means an organic solvent which can dissolve by 5 g or more in 100 g of water. The first and second water-soluble organic solvents are sometimes collectively referred to as a "specific solvent"

In Formula (1), $R^1$ represents a hydrogen atom or an alkyl group having 1 to 4 carbon atoms (such as a methyl group, an ethyl group, a propyl group or a butyl group). An alkyl group having 1 to 4 carbon atoms is preferable from the viewpoint of curl suppression effect exhibited thereby.

In Formula (2), $R^2$ represents a hydrogen atom, an alkyl group having 1 to 4 carbon atoms (such as a methyl group, an ethyl group, a propyl group or a butyl group) or a group derived from a sugar alcohol having 3 to 12 carbon atoms. An alkyl group having 1 to 4 carbon atoms and a group derived from a sugar alcohol having 3 to 6 carbon atoms are preferable from the viewpoint of curl suppression effect exhibited thereby.

Here, a "group derived from a sugar alcohol" means a group formed by removing at least one hydroxyl group from a sugar alcohol. The position of the hydroxyl group to be removed from the sugar alcohol is not particularly limited, and the group derived from the sugar alcohol may be a mixture of two or more kinds of groups formed by removing a hydroxyl group from a position that differs depending on the kind of group. Further, the group derived from a sugar alcohol may be a divalent or higher-valent group formed by removing two or more hydroxyl groups.

In Formulae (1) and (2), each $A^1$ independently represents an ethyleneoxy group or a propyleneoxy group, and each $A^2$ independently represents an ethyleneoxy group or a propyleneoxy group. When the total number of ethyleneoxy groups and propyleneoxy groups in $(A^1)_n$ is two or more, $(A^1)_n$ may include only an ethyleneoxy group or ethyleneoxy groups, or include only a propyleneoxy group or propyleneoxy groups, or include at least one ethyleneoxy group and at least one propyleneoxy group. When $A^1$ contains at least one ethyleneoxy group and at least one propyleneoxy group, $(A^1)_n$ may be a block polymer or a random polymer. $(A^2)_m$ may include only ethyleneoxy groups, or include only propyleneoxy groups, or include at least one ethyleneoxy group and at least one propyleneoxy group. When $A^2$ contains at least one ethyleneoxy group and at least one propyleneoxy group, $(A^2)_m$ may be a block polymer or a random polymer.

In Formula (2), m represents an integer from 3 to 40. From the viewpoint of ink jetting stability, m is preferably from 3 to 12.

"SP value" as described in the invention means the solubility parameter (SP value) of a solvent, which is a value expressed by the square root of the cohesive energy of molecules. SP values are described in the *Polymer Handbook (Second Edition)*, Chapter IV: "Solubility Parameter Values", and the values described therein are regarded as SP values in the invention. The unit for the SP value is $(MPa)^{1/2}$, and the SP values given represent values at a temperature of 25° C.

When the SP value data of a solvent of interest is not described in the above reference book, the value calculated by the method described in R. F. Fedors, *Polymer Engineering Science*, 14, p 147 (1967) is used as the SP value in the invention.

Specific examples of water-soluble organic solvents having an SP value of 27.5 or less are shown below. However, the invention is not limited thereto. The SP values are shown within the parentheses.

diethyleneglycol monoethyl ether (DEGmEE) (22.4);
diethyleneglycol monobutyl ether (DEGmBE) (21.5);
diethyleneglycol diethyl ether (DEGdEE) (16.8);
triethyleneglycol monobutyl ether (TEGmBE) (21.1);
tripropyleneglycol monomethyl ether (TPGmME) (20.4);

propyleneglycol monoethyl ether (PGmEE) (22.3);
dipropyleneglycol (DPG) (27.1);
dipropyleneglycol monomethyl ether (DPGmME) (21.3);
tripropylene glycol (TPG) (24.7);
1,2-hexanediol (27.4);
trioxypropylene glyceryl ether (26.4) (for example, SANNIX GP-250 or NEWPOL GP-250 (trade names), manufactured by Sanyo Chemical Industries, Ltd.);
hexaoxypropylene glyceryl ether (23.2) (for example, NEWPOL GP-400 (trade name), manufactured by Sanyo Chemical Industries, Ltd.);
hexadecaoxypropylene glyceryl ether (20.2) (for example, NEWPOL GP-1000 (trade name), manufactured by Sanyo Chemical Industries, Ltd.);
dioxyethylene dioxypropylene butyl ether (20.1) (for example, NEWPOL 50HB-55 (trade name), manufactured by Sanyo Chemical Industries, Ltd.);
pentaoxyethylene pentaoxypropylene butyl ether (19.7) (for example, NEWPOL 50HB-100 (trade name), manufactured by Sanyo Chemical Industries, Ltd.);
decaoxyethylene heptaoxypropylene butyl ether (19.0) (for example, NEWPOL 50HB-260 (trade name), manufactured by Sanyo Chemical Industries, Ltd.);
POP(4) diglyceryl ether (26.1) (for example, SC-P400 (trade name), manufactured by Sakamoto Yakuhin Kogyo Co., Ltd.);
POP(9) diglyceryl ether (22.7) (for example, SC-P750 (trade name), manufactured by Sakamoto Yakuhin Kogyo Co., Ltd.);
POE(20) diglyceryl ether (22.4) (for example, SC-E1000 (trade name), manufactured by Sakamoto Yakuhin Kogyo Co., Ltd.); and
POE(40) diglyceryl ether (21.0) (for example, SC-E2000 (trade name), manufactured by Sakamoto Yakuhin Kogyo Co., Ltd.).

POP(4) diglyceryl ether represents a compound in which four propylene oxide groups are attached to diglycerin, and POE(20) diglyceryl ether represents a compound in which twenty ethylene oxide groups are attached to diglycerin. The other compounds are defined in a similar way.

For reference, examples of water-soluble organic solvents whose SP values are more than 27.5 are shown with SP value thereof.
glycerin (33.5);
diethyleneglycol (DEG) (30.6);
triethyleneglycol (TEG) (27.8); and
trimethylolpropane (28.8).

The SP value of each of the first and second water-soluble organic solvents in the invention is 27.5 or less, preferably from 16 to 27.5, and more preferably from 18 to 26.5. When the SP value of the water-soluble organic solvents is more than 27.5, curl suppression effect exhibited thereby may be reduced.

In the invention, the first water-soluble organic solvent may include two or more compounds, and the second water-soluble organic solvent may include two or more compounds. In any case, the total content of compounds having an SP value of 27.5 or less is preferably 70 mass % or more, and more preferably 90 mass % or more, with respect to the total mass of water-soluble organic solvents.

The molecular weight of the first water-soluble organic solvent is from 100 to 210, and is preferably from 120 to 190. When the molecular weight is less than 100, ink storage stability may be decreased. When the molecular weight is more than 210, curl suppression effect exhibited by the ink may be reduced.

The molecular weight of the second water-soluble organic solvent is from 240 to 2000, and is preferably from 250 to 800. When the molecular weight is more than 2000, the ink viscosity may increase, whereby the jetting stability and/or storage stability of the ink may decrease. When the molecular weight is less than 240, the jetting stability and/or storage stability of the ink may decrease.

The molecular weight of the water-soluble organic solvent means a molecular weight calculated from a structural formula when the water-soluble organic solvent is composed of a single compound, and means a number-average molecular weight when the water-soluble organic solvent is a mixture of plural compounds.

Examples of the first water-soluble organic solvent include propyleneglycol monoethyl ether (PGmEE), diethyleneglycol monoethyl ether (DEGmEE), diethyleneglycol monobutyl ether (DEGmBE), triethyleneglycol monobutyl ether (TEGmBE), dipropyleneglycol (DPG), dipropyleneglycol monomethyl ether (DPGmME), tripropylene glycol (TPG), tripropyleneglycol monomethyl ether (TPGmME), and 1,2-hexanediol.

Examples of the second water-soluble organic solvent include NEWPOL GP-250, GP-400, 50HB-55, 50HB-100, 50HB-260 (trade names, manufactured by Sanyo Chemical Industries, Ltd.), and SC-P400 and SC-E2000 (trade names, manufactured by Sakamoto Yakuhin Kogyo Co., Ltd.).

In the invention, in consideration of curl suppression effect exhibited thereby, it is preferable that the first water-soluble organic solvent be at least one selected from propyleneglycol monoethyl ether, diethyleneglycol monoethyl ether, diethyleneglycol monobutyl ether, triethyleneglycol monobutyl ether, dipropyleneglycol, dipropyleneglycol monomethyl ether, or tripropyleneglycol monomethyl ether, and the second water-soluble organic solvent be at least one selected from polyoxypropylene glyceryl ether having 3 to 9 propyleneoxy groups or polyoxyethylene polyoxypropylene butyl ether in which the total number of ethyleneoxy groups and propyleneoxy groups is from 3 to 20.

It is more preferable that the first water-soluble organic solvent be at least one selected from diethyleneglycol monoethyl ether, diethyleneglycol monobutyl ether or dipropyleneglycol and the second water-soluble organic solvent be at least one selected from polyoxypropylene glyceryl ether having 3 to 6 propyleneoxy groups or polyoxyethylene polyoxypropylene butyl ether in which the total number of ethyleneoxy groups and propyleneoxy groups is from 3 to 12.

In the invention, the total content of the first and second water-soluble organic solvents is not particularly limited. In consideration of ink jetting stability, the total content is preferably from 1 to 40 mass %, more preferably from 5 to 30 mass %, and still more preferably from 10 to 25 mass %, with respect to the total mass of the inkjet recording liquid.

The mass ratio of the content of the first water-soluble organic solvent to the content of the second water-soluble organic solvent is from 1:3 to 3:1, and preferably from 1:2 to 2:1, more preferably from 2:3 to 3:2, and even more preferably 1:1 in consideration of curl suppression effect exhibited thereby. When the molecular weight of the second water-soluble organic solvent is more than 900, the mass ratio of the content of the first water-soluble organic solvent to the content of the second water-soluble organic solvent is preferably from 1:1 to 3:1, and more preferably from 2:1 to 3:1, in which case, the content of the first water-soluble organic solvent is higher than that of the second water-soluble organic solvent.

In addition to the first and second water-soluble organic solvents, the inkjet recording liquid of the invention may further contain a third water-soluble organic solvent other than the first and second water-soluble organic solvents as long as there is no adverse influence on effects of the invention.

When the inkjet recording liquid contains the third water-soluble organic solvent in addition to the first and second water-soluble organic solvents, the anti-drying effect, the wetting effect, or the penetration accelerating effect can more easily obtained.

The anti-drying effect or the wetting effect means, for example, an effect of preventing clogging of an ink ejection opening of a nozzle due to drying of the inkjet ink. As the anti-drying agent or the wetting agent, a water-soluble organic solvent having a lower vapor pressure than that of water is preferable.

The penetration accelerating effect means an effect of facilitating infiltration of the ink into paper, and a water-soluble organic solvent is preferably used as a penetration accelerator.

Examples of the third water-soluble organic solvent include polyhydric alcohols including glycerin, 1,2,6-hexanetriol, trimethylolpropane, and alkanediols such as ethyleneglycol, propyleneglycol, diethyleneglycol, triethyleneglycol, tetraethyleneglycol, pentaethyleneglycol, 2-butene-1,4-diol, 2-ethyl-1,3-hexanediol, 2-methyl-2,4-pentanediol, 1,2-octanediol, 1,2-pentanediol, or 4-methyl-1,2-pentanediol; alkylalcohols having 1 to 4 carbon atoms such as ethanol, methanol, butanol, propanol or isopropanol; glycol ethers such as ethyleneglycol monomethyl ether, ethyleneglycol monoethyl ether, ethyleneglycol monobutyl ether, ethyleneglycol monomethyl ether acetate, ethyleneglycol mono-iso-propyl ether, ethyleneglycol mono-n-butyl ether, ethyleneglycol mono-t-butyl ether, 1-methyl-1-methoxybutanol, or propyleneglycol monomethyl ether; 2-pyrrolidone, N-methyl 2-pyrrolidone, 1,3-dimethyl-2-imidazolidinone, formamide, acetamide, dimethylsulfoxide, sorbit, sorbitan, acetin, diacetin, triacetin, and sulfolane. These solvents may be used singly, or in combination of two or more thereof.

When the third water-soluble organic solvent is used for the purpose of an anti-drying agent or a wetting agent, the third water-soluble organic solvent is preferably a polyhydric alcohol, and examples thereof include glycerin, ethyleneglycol, diethyleneglycol, triethyleneglycol, propyleneglycol, dipropyleneglycol, 1,3-butanediol, 2,3-butanediol, 1,4-butanediol, 3-methyl-1,3-butanediol, 1,5-pentanediol, tetraethyleneglycol, 1,6-hexanediol, 2-methyl-2,4-pentanediol, polyethyleneglycol, 1,2,4-butanetriol, and 1,2,6-hexanetriol. The third water-soluble organic solvent as an ant-drying agent or a wetting agent may be used singly, or in combination of two or more thereof.

When the third water-soluble organic solvent is used for the purpose of a penetrating agent, the third water-soluble organic solvent is preferably a polyol compound. Examples of the polyol compound include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, 5-hexene-1,2-diol, 2-ethyl-1,3-hexanediol or 2,2,4-trimethyl-1,3-pentanediol. Among these compounds, 2-ethyl-1,3-hexanediol and 2,2,4-trimethyl-1,3-pentanediol are preferable.

The third water-soluble organic solvent used in the invention may be used singly, or two or more kinds thereof may be mixed and used.

In consideration of curl suppression effect exhibited thereby, the total content of the first and second water-soluble organic solvents is preferably 70 mass % or more, more preferably 80 mass % or more, and still more preferably 90 mass % or more, with respect to the total mass of water-soluble organic solvent.

In addition, in consideration of curl suppression effect exhibited thereby, the total content of the water-soluble organic solvent having an SP value of 27.5 or less is preferably 70 mass % or more, more preferably 80 mass % or more, and still more preferably 90 mass % or more, with respect to the total mass of water-soluble organic solvent.

The addition amount of water used in the inkjet recording liquid of the invention is not particularly limited. The addition amount of water is preferably from 10 to 99 mass %, more preferably from 30 to 80 mass % and still more preferably from 50 to 70 mass %.

Colorant

The inkjet recording liquid of the invention contains at least one colorant (hereinafter, may be referred to as "coloring agent"). The colorant used for the invention is preferably a water-dispersible pigment, but any colorant is usable as long as it has a function of forming an image by coloring. For example, the colorant may be a dye or a color particle.

Examples of the water-dispersible pigments include following classes (1) to (4):

(1) An encapsulated pigment, that is, a polymer emulsion formed by incorporating a pigment into polymer particles; more specifically, in the polymer emulsion, pigment particles are dispersed in water and have a resin layer formed of a hydrophilic water-insoluble resin that covers the surfaces of the pigment particles and imparts hydrophilicity to the pigment particles;

(2) A self-dispersing pigment, that is, a pigment having at least one type of hydrophilic group on a surface thereof and exhibiting at least one of water-dispersibility or water-solubility in the absence of a dispersant; more specifically, the pigment is prepared by subjecting the surfaces of pigment particles (such as carbon black particles) to an oxidizing treatment so as to impart hydrophilicity to the pigment particles and so as to enable the pigment itself to disperse in water;

(3) A resin dispersed pigment, that is, a pigment dispersed using a water-soluble polymer compound having a weight average molecular weight of 50,000 or less; and (4) A surfactant-dispersed pigment, that is, a pigment dispersed using a surfactant.

Among these pigments, (1) an encapsulated pigment and (2) a self-dispersing pigment are preferable, and (1) an encapsulated pigment is particularly preferable.

In the following, the encapsulated pigment will be described in detail.

The resin used in the encapsulated pigment is not specifically limited, but is preferably a polymer compound that is self-dispersing or dissolvable in a mixed solvent of water and a water-soluble organic solvent and that has an anionic (acidic) group. In general, the number average molecular weight of the resin is preferably in the range of about 1000 to about 100,000, and particularly preferably in the range of about 3000 to about 50,000. The resin is preferably a resin that can dissolve in an organic solvent to form a solution. When the number average molecular weight of the resin is within the above ranges, the resin can exhibit sufficient function as a cover layer on pigment particles or as a coated layer on an ink component in an ink composition. The resin is preferably used in the form of an alkali metal salt or an organic amine salt.

The resin used for the encapsulated pigment may be, for example, a material having an anionic group, and examples thereof include thermoplastic, thermosetting, or modified resins of the following types of resin: an acrylic resin, an epoxy resin, a polyurethane resin, a polyether resin, a polyamide resin, an unsaturated polyester resin, a phenol resin, a silicone resin, a fluoropolymer compound; a polyvinyl resin such as polyvinyl chloride, polyvinyl acetate, polyvinyl alcohol or polyvinyl butyral; a polyester resin such as an alkyd resin or a phthalic acid resin; an amino resin such as a melamine resin, a melamine-formaldehyde resin, an aminoalkid co-condensed resin, a urea formaldehyde resin, or a urea resin; and copolymers or mixtures of two or more of these resins.

Of the above resins, an anionic acrylic resin can be obtained, for example, by polymerizing, in a solvent, an acrylic monomer having an anionic group (hereinafter, referred to as an anionic group-containing acrylic monomer) and, optionally, one or more other monomers copolymerizable with the anionic group-containing acrylic monomer. Examples of the anionic group-containing acrylic monomer include an acrylic monomer having one or more anionic groups selected from the group consisting of a carboxylic group, a sulfonic acid group and a phosphonic acid group. Among these monomers, an acrylic monomer having a carboxyl group is preferable.

Examples of the acrylic monomer having a carboxyl group include acrylic acid, methacrylic acid, crotonic acid, ethacrylic acid, propylacrylic acid, isopropylacrylic acid, itaconic acid and fumaric acid. Among these monomers, acrylic acid and methacrylic acid are preferable.

An encapsulated pigment can be manufactured by a conventional physical and/or chemical method by using the above components. According to a preferable embodiment of the invention, the encapsulated pigment can be manufactured by the methods described in JP-A Nos. 9-151342, 10-140065, 11-209672, 11-172180, 10-25440, or 11-43636, or preferably by a phase inversion emulsification method.

In the present invention, a self-dispersing pigment is an example of a preferable pigment. A self-dispersing pigment is a pigment in which a number of hydrophilic functional groups and/or a salt thereof (hereinafter, referred to as a dispersibility-imparting group) are directly or indirectly (via an alkyl group, an alkyl ether group, an aryl group or the like) bonded to the surfaces of particles of the pigment, so that the pigment particles can be dispersed in an aqueous medium without a dispersant. Here, the term "dispersed in an aqueous medium without a dispersant", indicates a state in which the pigment particles are dispersible in the aqueous medium even when a dispersant for dispersing the pigment is not used.

An ink containing a self-dispersing pigment as a colorant does not need to contain a dispersant, which is otherwise contained for dispersing a usual pigment. Therefore, the ink containing a self-dispersing pigment is free from decrease in defoaming properties due to a dispersant, and generation of foam is hardly observed in the ink containing a self-dispersing pigment; accordingly an ink with excellent ink jetting stability can be easily prepared.

Examples of dispersibility-imparting groups to be bonded to the surfaces of self-dispersing pigment particles include —COOH, —CO, —OH, —SO$_3$H, —PO$_3$H$_2$, and a quaternary ammonium, and salts thereof. A self-dispersing pigment can be manufactured by subjecting a pigment as a raw material to a physical or chemical treatment so as to bond (graft) a dispersibility-imparting group or an active species having a dispersibility-imparting group to the surfaces of the pigment particles.

Examples of the physical treatment include a vacuum plasma treatment. Examples of the chemical treatment include a wet oxidizing method in which surfaces of pigment particles are oxidized by an oxidizing agent in water and a method in which p-aminobenzoic acid is bonded to surfaces of pigment particles whereby a carboxyl group is linked to the pigment particles through the phenyl group.

In the invention, preferable examples of the self-dispersing pigment include a self-dispersing pigment whose surface has been subjected to an oxidation treatment with a hypohalous acid and/or hypohalite and a self-dispersing pigment whose surface has been subjected to an oxidation treatment with ozone. Commercially available products may also be used as the self-dispersing pigment. Examples thereof include, MICROJET CW-1 (trade name, manufactured by Orient Chemical Industry), and CAB-O-JET200 and CAB-O-JET300 (trade names, manufactured by Cabot Corporation).

Pigment

The pigment used in the invention is not specifically limited, and may be appropriately selected depending on the purposes. For example, the pigment may be either an organic pigment or an inorganic pigment, or both.

Examples of the organic pigment include azo pigments, polycyclic pigments, dye chelates, nitro pigments, nitroso pigments and aniline black. In particular, azo pigments and polycyclic pigments are preferable.

Examples of the azo pigments include an azo lake pigment, an insoluble azo pigment, a condensed azo pigment, and a chelate azo pigment.

Examples of the polycyclic pigments include a phthalocyanine pigment, a perylene pigment, a perynone pigment, an anthraquinone pigment, a quinacridone pigment, a dioxazine pigment, an indigo pigment, a thioindigo pigment, an isoindolinone pigment, and a quinophthalone pigment.

Examples of the dye chelates include basic dye chelate pigments and acid dye chelate pigments.

Examples of the inorganic pigments include titanium oxide, iron oxide, calcium carbonate, barium sulfate, aluminum hydroxide, barium yellow, cadmium red, chrome yellow, and carbon black. Among these pigments, carbon black is particularly preferable. The carbon black may be, for example, a carbon black manufactured by a known method such as a contact method, a furnace method or a thermal method.

Examples of black pigments include carbon blacks such as RAVEN 7000, RAVEN 5750, RAVEN 5250, RAVEN 5000 ULTRAII, RAVEN 3500, RAVEN 2000, RAVEN 1500, RAVEN 1250, RAVEN 1200, RAVEN 1190 ULTRAII, RAVEN 1170, RAVEN 1255, RAVEN 1080, RAVEN 1060 or RAVEN700 (trade names, manufactured by Columbian Chemicals Co.); REGAL 400R, REGAL 330R, REGAL 660R, MOGUL L, BLACK PEARLS L, MONARCH 700, MONARCH 800, MONARCH 880, MONARCH 900, MONARCH 1000, MONARCH 1100, MONARCH 1300 or MONARCH 1400 (trade names, manufactured by Cabot Corporation); COLOR BLACK FW1, COLOR BLACK FW2, COLOR BLACK FW2V, COLOR BLACK 18, COLOR BLACK FW200, COLOR BLACK S150, COLOR BLACK S160, COLOR BLACK S170, PRINTEX 35, PRINTEX U, PRINTEX V, PRINTEX 140U, PRINTEX 140V, SPECIAL BLACK 6, SPECIAL BLACK 5, SPECIAL BLACK 4A or SPECIAL BLACK 4 (trade names, manufactured by Degussa); No. 25, No. 33, No. 40, No. 45, No. 47, No. 52, No. 900, No. 2200B, No. 2300, MCF-88, MA600, MA7, MA8 or MA100 (trade names, manufactured by Mitsubishi Chemical Corporation). However, in the invention, the black pigments are not limited thereto.

Organic pigments usable in the invention include yellow ink pigments such as C. I. Pigment Yellow 1, 2, 3, 4, 5, 6, 7, 10, 11, 12, 13, 14, 14C, 16, 17, 24, 34, 35, 37, 42, 53, 55, 65, 73, 74, 75, 81, 83, 93, 95, 97, 98, 100, 101, 104, 108, 109, 110, 114, 117, 120, 128, 129, 138, 150, 151, 153, 154, 155 or 180.

Organic pigments usable in the invention further include magenta ink pigments such as C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 48 (Ca), 48 (Mn), 48:2, 48:3, 48:4, 49, 49:1, 50, 51, 52, 52:2, 53:1, 53, 55, 57 (Ca), 57:1, 60, 60:1, 63:1, 63:2, 64, 64:1, 81, 83, 87, 88, 89, 90, 101 (iron oxide red), 104, 105, 106, 108 (cadmium red), 112, 114, 122 (quinacridone magenta), 123, 146, 149, 163, 166, 168, 170, 172, 177, 178, 179, 184, 185, 190, 193, 202, 209, 219, 269 or C.I. pigment violet 19. Among these pigments, C.I. pigment red 122 is particularly preferable.

Furthermore, organic pigments usable in the invention further include cyan ink pigments such as C.I. Pigment Blue 1, 2, 3, 15, 15:1, 15:2, 15:3, 15:34, 16, 17:1, 22, 25, 56, 60, C.I. Bat Blue 4, 60 or 63. Among these pigments, C. I. Pigment Blue 15:3 is particularly preferable.

The pigment may be used singly or in combination of two or more thereof, each of which may be selected from the above classes of pigments and may belong to the same class as each other or different classes from each other.

Dispersant

In the invention, the dispersant used in an encapsulated pigment or a resin dispersed pigment may be selected from a nonionic compound, an anionic compound, a cationic compound, or an amphoteric compound.

The dispersant is, for example, a copolymer formed from monomers having an α,β-ethylenic unsaturated group. Examples of the monomers having an α,β-ethylenic unsaturated group include ethylene, propylene, butene, pentene, hexene, vinyl acetate, allyl acetate, acrylic acid, methacrylic acid, crotonic acid, a crotonic acid ester, itaconic acid, an itaconic acid monoester, maleic acid, a maleic acid monoester, a maleic acid diester, fumaric acid, a fumaric acid monoester, vinyl sulfonic acid, styrene sulfonic acid, sulfonated vinyl naphthalene, vinyl alcohol, acrylamide, methacryloxy ethyl phosphate, bismethacryloxyethyl phosphate, methacryloxyethylphenyl acid phosphate, ethyleneglycol dimethacrylate, diethyleneglycol dimethacrylate, styrene, styrene derivatives such as α-methyl styrene or vinyltoluene; vinyl cyclohexane, vinyl naphthalene, vinyl naphthalene derivatives, an alkyl acrylate which may have an aromatic substituent, phenyl acrylate, an alkyl methacrylate which may have an aromatic substituent, phenyl methacrylate, a cycloalkyl methacrylate, an alkyl crotonate, a dialkyl itaconate, a dialkyl maleate, vinyl alcohol, and derivatives of the above compounds.

A homopolymer formed by polymerization of one kind of monomer having an α,β-ethylenic unsaturated group, which may be selected from the above monomers, or a copolymer formed by copolymerization of plural kinds of monomer having an α,β-ethylenic unsaturated group, each of which may be selected from the above monomers, may be used as a polymer dispersant.

Examples of the dispersant include an alkyl acrylate-acrylic acid copolymer, an alkyl methacrylate-methacrylic acid copolymer, a styrene-alkyl acrylate-acrylic acid copolymer, styrene-phenyl methacrylate-methacrylic acid copolymer, a styrene-cyclohexyl methacrylate-methacrylic acid copolymer, a styrene-styrene sulfonic acid copolymer, a styrene-maleic acid copolymer, a styrene-methacrylic acid copolymer, a styrene-acrylic acid copolymer, a vinyl naphthalene-maleic acid copolymer, a vinyl naphthalene-methacrylic acid copolymer, a vinyl naphthalene-acrylic acid copolymer, polystyrene, a polyester, and polyvinyl alcohol.

The dispersant used in the invention is preferably a dispersant having a weight-average molecular weight of from 2000 to 60,000. The ratio of the addition amount of the dispersant to the pigment is preferably from 10% to 100%, more preferably from 20% to 70% and still more preferably from 40% to 50%, based on the mass.

The content of the colorant in the inkjet recording liquid of the invention is preferably from 0.1 to 15 mass %, and more preferably from 1 to 10 mass %, in consideration of image density and image storage stability.

Surfactant

The inkjet recording liquid of the invention may contain at least one surfactant. By adding the surfactant, the surface tension of the inkjet recording liquid can be adjusted. Any of a nonionic surfactant, a cationic surfactant, an anionic surfactant or a betaine surfactant can be used. In order for the ink of the invention to be satisfactorily applied by an inkjet system, the addition amount of the surfactant is such an amount that the surface tension of the ink of the invention at 25° C. is adjusted preferably to a range of from 20 mN/m to 60 mN/m, more preferably from 20 mN/m to 45 mN/m, and still more preferably from 25 mN/m to 40 mN/m.

As the surfactant in the invention, a compound having a structure in which a hydrophilic moiety and a hydrophobic moiety are included in a molecule can be effectively used. Any of an anionic surfactant, a cationic surfactant, an amphoteric surfactant, or a nonionic surfactant can be used. Furthermore, the above-mentioned polymer substance (polymer dispersant) is also usable as a surfactant.

Examples of the anionic surfactant include sodium dodecylbenzene sulfonate, sodium lauryl sulfate, a sodium alkyl diphenyl ether disulfonate, a sodium alkylnaphthalene sulfonate, a sodium dialkyl sulfosuccinate, sodium stearate, potassium oleate, sodium dioctylsulfosuccinate, a sodium polyoxyethylene alkyl ether sulfate, a sodium polyoxyethylene alkylphenyl ether sulfate, sodium dialkylsulfosuccinate, sodium stearate, sodium oleate, and sodium t-octylphenoxyethoxy-polyethoxyethyl sulfate. The surfactant may be used singly, or in combination of two or more thereof.

Examples of the nonionic surfactant include polyoxyethylene lauryl ether, polyoxyethylene octyl phenyl ether, polyoxyethylene oleyl phenyl ether, polyoxyethylene nonyl phenyl ether, oxyethylene-oxypropylene block copolymer, t-octyl phenoxyethyl polyethoxyethanol, and nonylphenoxyethyl polyethoxyethanol. The nonionic surfactant may be used singly, or in combination of two or more thereof.

Examples of the cationic surfactant include a tetraalkyl ammonium salt, an alkylamine salt, a benzalkonium salt, an alkylpyridinium salt, and an imidazolium salt. Specific examples include dihydroxyethyl stearylamine, 2-heptadecenyl-hydroxyethyl imidazoline, lauryldimethyl benzyl ammonium chloride, cetyl pyridinium chloride, and stearamide methylpyridium chloride.

The addition amount of surfactant to be added to the inkjet recording liquid of the invention is not specifically limited, but is preferably from 1 mass % or more, more preferably from 1 to 10 mass %, and even more preferably from 1 to 3 mass %.

Resin Particles

The inkjet recording liquid according to the invention preferably includes at least one type of resin particles. When the inkjet recording liquid includes the resin particles, the fixability of the inkjet recording liquid to a recording medium and the rubbing resistance of the recorded image can be further improved. The resin particles preferably have a function of immobilizing the inkjet recording liquid (i.e., the image) by increasing the viscosity of the ink upon contact with the after-mentioned liquid composition (hereinafter sometimes referred to as "processing liquid") that improves printing property; the increase in the ink viscosity may be accomplished by aggregation of the resin particles or destabilization of the dispersion state of the resin particles.

Preferable examples of the resin particles include particles of any of the following: a (meth)acrylic resin, a vinyl acetate resin, a styrene-butadiene resin, a vinyl chloride resin, an acrylate-styrene resin, a butadiene resin, a styrene resin, a crosslinked acrylic resin, a crosslinked styrene resin, a benzoguanamine resin, a phenol resin, a silicone resin, an epoxy resin, a urethane resin, a paraffin resin, or a fluororesin. Among them, the resin particles of a (meth)acrylic resin, an acrylate-styrene resin, a styrene resin, a crosslinked acrylic resin, and a crosslinked styrene resin are preferable. In particular, (meth)acrylic resin particles are preferable.

The (meth)acrylic resin can be obtained, for example by polymerizing, in a solvent, a (meth)acrylic monomer having an anionic group (also referred to as an "anionic-group-containing (meth)acrylic monomer) and, optionally, one or more other monomers that can copolymerize with the anionic-group-containing (meth)acrylic monomer. The anionic-group-containing (meth)acrylic monomer is, for example, a (meth)acrylic monomer having at least one of a carboxyl group, a sulfonic acid group, or a phosphonic acid group. In particular, a (meth)acrylic monomer having a carboxyl group is preferable, such as acrylic acid, methacrylic acid, crotonic acid, ethacrylic acid, propylacrylic acid, isopropylacrylic acid, itaconic acid or fumaric acid. Acrylic acid or methacrylic acid is further preferable.

The resin particles are preferably in the form of a latex, which is an aqueous dispersion of the resin particles. Various latexes are usable, such as a (meth)acrylic latex, a vinyl acetate latex, a styrene latex, or a polyester latex; a (meth) acrylic latex is particularly preferable.

The resin particles in the invention are preferably particles of a self-dispersing polymer, and more preferably particles of a self-dispersing polymer having a carboxyl group, from the viewpoint of improving the jetting stability and the liquid stability (particularly, dispersion stability) when the aftermentioned colorant (particularly, a pigment) is used. The particles of a self-dispersing polymer (hereinafter sometimes referred to as "self-dispersing polymer particles") are particles of a water-insoluble polymer that can get into a dispersed state in an aqueous medium due to a functional group (particularly, an acidic group or a salt thereof) of the polymer itself even in the absence of other surfactants and that does not contain a free emulsifier.

The scope of the term, "dispersed state", used herein includes an emulsified state (emulsion) in which a water-insoluble polymer in the liquid state is dispersed in an aqueous medium and a state (suspension) in which a water-insoluble polymer in the solid state is dispersed in an aqueous medium.

The water-insoluble polymer used in the invention is preferably a water-insoluble polymer that can get into a state in which the water-insoluble polymer is dispersed in the solid state, in consideration of the aggregation speed and the fixability when the water-insoluble polymer is contained in an inkjet recording liquid.

The following procedure can be used to determine whether a water-insoluble polymer is a self-dispersing polymer as mentioned herein: 30 g of a water-insoluble polymer is dissolved in 70 g of an organic solvent (such as methyl ethyl ketone) to form a solution, the solution is mixed with 200 g of water and a neutralizing agent that can neutralize the salt-forming groups of the water-insoluble polymer to a degree of 100% (the neutralizing agent being sodium hydroxide if the salt-forming groups are anionic, or acetic acid if the salt-forming groups are cationic), the mixture is stirred with a stirrer having a stirring blade at a rotation rate of 200 rpm at 25° C. for 30 minutes, and the organic solvent is removed from the mixture liquid. If a stable dispersion state of the water-insoluble polymer in the mixture liquid is confirmed by visual observation at 25° C. for at least one week after the removal of the organic solvent, the water-insoluble polymer is considered to be a self-dispersing polymer.

The term "water-insoluble polymer" used herein refers to a polymer that shows a solubility of 10 g or less when the polymer is dried at 105° C. for 2 hours and then dissolved in 100 g of water at 25° C. The solubility is preferably 5 g or less, and more preferably 1 g or less. The solubility is measured after the polymer is 100% neutralized with either sodium hydroxide or acetic acid depending on the kind of the salt-forming groups of the water-insoluble polymer.

The aqueous medium includes water and, optionally, a hydrophilic organic solvent. In the invention, the aqueous medium is preferably formed by water and a hydrophilic organic solvent whose amount is 0.2 mass % or less with respect to the water, and is more preferably formed by water only.

The main chain backbone of the water-insoluble polymer is not particularly limited, and may be, for example, a vinyl polymer or a condensed polymer (such as an epoxy resin, polyester, polyurethane, polyamide, cellulose, polyether, polyurea, polyimide, or polycarbonate). Among them, a vinyl polymer is preferable from the viewpoint of improving the dispersion stability of the polymer particles.

Preferable examples of the vinyl polymer and the monomer forming the vinyl polymer include those described in JP-A Nos. 2001-181549 and 2002-88294. A vinyl polymer may be used which has a dissociative group introduced to the terminal of the polymer chain; the dissociative group may be introduced by using a chain transfer agent, polymerization initiator, or iniferter that has the dissociative group (or a substituent that can be converted to the dissociative group) for radical polymerization of a vinyl monomer, or by using a compound having the dissociative group (or a substituent that can be converted to the dissociative group) as either of an initiator or a terminator for ion polymerization.

Preferable examples of the condensed polymer and the monomer forming the condensed polymer include those described in JP-A No. 2001-247787.

The self-dispersing polymer particles preferably include a water-insoluble polymer having a hydrophilic structural unit and a hydrophobic structural unit, from the viewpoint of self-dispersibility. The hydrophobic structural unit is preferably derived from a monomer containing an aromatic group. The expression "... structural unit ... derived from ... (A)" used herein means a component in a polymer which component is formed by the binding of (A) to an adjacent structural unit or units.

The hydrophilic structural unit is not particularly limited as long as it derives from a monomer containing a hydrophilic group. The hydrophilic structural unit may derive from only one type of hydrophilic-group-containing monomer or two or more types of hydrophilic-group-containing monomer. The hydrophilic group is not particularly limited, and may be a dissociative group or a nonionic hydrophilic group.

In the invention, the hydrophilic group is preferably a dissociative group, and more preferably an anionic dissociative group, from the viewpoints of enhancing self-dispersibility and providing stability of the formed emulsion or dispersion state. The dissociative group may be, for example, a carboxyl group, a phosphoric acid group, or a sulfonic acid group. In particular, a carboxyl group is preferable as the dissociative group, in consideration of the fixability of an inkjet recording liquid containing the self-dispersing polymer particles.

The hydrophilic-group-containing monomer in the invention is preferably a monomer containing a dissociative group, and more preferably a monomer containing a dissociative group and an ethylenic unsaturated bond, in consideration of self-dispersibility and aggregation property.

The dissociative-group-containing monomer may be, for example, an unsaturated carboxylic acid monomer, an unsaturated sulfonic acid monomer, or an unsaturated phosphoric acid monomer Examples of the unsaturated carboxylic acid monomer include acrylic acid, methacrylic acid, crotonic acid, itaconic acid, maleic acid, fumaric acid, citraconic acid, and 2-methacryloyloxymethylsuccinic acid. Examples of the unsaturated sulfonic acid monomer include styrenesulfonic acid, 2-acrylamide-2-methylpropane sulfonic acid, 3-sulfopropyl (meth)acrylate, and bis-(3-sulfopropyl) itaconate. Examples of the unsaturated phosphoric acid monomer include vinyl phosphonic acid, vinyl phosphate, bis(methacryloxyethyl) phosphate, diphenyl-2-acryloyloxyethyl phosphate, diphenyl-2-methacryloyloxyethyl phosphate, and dibutyl-2-acryloyloxyethyl phosphate.

Among the above dissociative-group-containing monomers, unsaturated carboxylic acid monomers are preferable, and acrylic acid and methacrylic acid are more preferable, in consideration of dispersion stability and jetting stability.

Examples of the monomer having a nonionic hydrophilic group include ethylenic unsaturated monomers containing a (poly)ethyleneoxy group or a polypropyleneoxy group such as 2-methoxyethyl acrylate, 2-(2-methoxyethoxy)ethyl acrylate, 2-(2-methoxyethoxy)ethyl methacrylate, ethoxytriethyleneglycol methacrylate, methoxypolyethyleneglycol monomethacrylate wherein the methoxypolyethyleneglycol has a molecular weight of from 200 to 1000, and polyethyleneglycol monomethacrylate wherein the polyethyleneglycol has a molecular weight of from 200 to 1000; and ethylenic unsaturated monomers having a hydroxyl group such as hydroxymethyl (meth)acrylate, 2-hydroxyethyl (meth)acrylate, 2-hydroxypropyl (meth)acrylate, 4-hydroxybutyl (meth)acrylate, hydroxypentyl (meth)acrylate, and hydroxyhexyl (meth)acrylate.

As the monomer having a nonionic hydrophilic group, an ethylenic unsaturated monomer whose terminal has an alkyl ether is preferable to an ethylenic unsaturated monomer whose terminal has a hydroxyl group, in consideration of the stability of the particles and the content of the water-soluble component.

Regarding the hydrophilic structural unit in the invention, an embodiment is preferable in which a hydrophilic unit having an anionic dissociative group is contained as the only hydrophilic structural unit in the self-dispersing polymer or in which both of a hydrophilic structural unit having an anionic dissociative group and a hydrophilic structural unit having a nonionic hydrophilic group are contained in the self-dispersing polymer.

It is preferable that two or more kinds of hydrophilic unit having an anionic dissociative group be contained in the self-dispersing polymer. It is also preferable that a hydrophilic structural unit having an anionic dissociative group be used in combination with two or more types of hydrophilic structural unit having a nonionic hydrophilic group.

The content of the hydrophilic structural unit in the self-dispersing polymer is preferably 25 mass % or less, more preferably from 1 to 25 mass %, still more preferably from 2 to 23 mass %, and further preferably from 4 to 20 mass %, in consideration of viscosity and stability over time.

When there are two or more types of hydrophilic structural unit, the total content of the hydrophilic structural units is preferably within the above range.

The content of the structural unit having an anionic dissociative group in the self-dispersing polymer is preferably within a range in which the acid value falls within the after-mentioned preferable range.

The content of the structural unit having a nonionic hydrophilic group is preferably from 0 to 25 mass %, more preferably from 0 to 20 mass %, and still more preferably from 0 to 15 mass %, in consideration of jetting stability and stability over time.

The self-dispersing polymer particles in the invention preferably contains a polymer having a carboxyl group, and more preferably contains a polymer having a carboxyl group and an acid value (mg KOH/g) of from 25 to 100, from the viewpoint of self-dispersibility and aggregation speed at the time of a contact with a processing liquid. Further, the acid value is more preferably from 25 to 80, and still more preferably from 30 to 65, from the viewpoint of self-dispersibility and aggregation speed at the time of a contact with a processing liquid.

In particular, an acid value (mg KOH/g) of 25 or more leads to an excellent stability of the self-dispersibility, and an acid value of 100 or less leads to improved aggregation property.

The aromatic-group-containing monomer is not particularly limited as long as the monomer is a compound containing an aromatic group and a polymerizable group. The aromatic group may be a group derived from an aromatic hydrocarbon or from an aromatic heterocycle. In the invention, the aromatic group is preferably an aromatic group derived from an aromatic hydrocarbon, from the viewpoint of improving the stability of the particle shape in an aqueous medium. The expression "group derived from an aromatic hydrocarbon or from an aromatic heterocycle" used herein means a group formed by removing at least one hydrogen atom from an aromatic hydrocarbon or from an aromatic heterocycle.

The polymerizable group may be a condensation-polymerizable group or an addition-polymerizable group. In the invention, the polymerizable group is preferably an addition-polymerizable group, and more preferably a group containing an ethylenic unsaturated bond, from the viewpoint of improving the stability of the particle shape in an aqueous medium.

The aromatic-group-containing monomer in the invention is preferably a monomer having an aromatic group derived from an aromatic hydrocarbon and an ethylenic unsaturated bond. The aromatic-group-containing monomer may be used singly or in combination of two or more thereof.

Examples of the aromatic-group-containing monomer include phenoxyethyl (meth)acrylate, benzyl (meth)acrylate, phenyl (meth)acrylate, and a styrene-based monomer. In particular, from the viewpoint of improving the balance between the hydrophilicity and hydrophobicity of the polymer chain and ink fixability, an aromatic-group-containing (meth)acrylate monomer is preferable, and at least one selected from phenoxyethyl (meth)acrylate, benzyl (meth)acrylate, or phenyl (meth)acrylate is more preferable, and phenoxyethyl (meth)acrylate and benzyl (meth)acrylate are still more preferable.

The term "(meth)acrylate" used herein refers to acrylate or methacrylate.

The self-dispersing polymer particles in the invention preferably include a structural unit derived from an aromatic-group-containing (meth)acrylate monomer at a content of from 10 to 95 mass %. When the content of the aromaticgroup-containing (meth)acrylate monomer is from 10 to 95 mass %, stability of self-emulsification or dispersion state improves, and, further, an increase in the ink viscosity can be suppressed.

In the invention, the content of the aromatic-group-containing (meth)acrylate monomer is more preferably from 15 to 90 mass %, still more preferably from 15 to 80 mass %, and particularly preferably from 25 to 70 mass %, from the viewpoints of improving stability of the self-dispersing state, stabilizing the particle shape in an aqueous medium through hydrophobic interaction between aromatic rings, and reducing the amount of water-soluble components by imparting appropriate hydrophobicity to the particles.

When a styrene-based monomer is used as an aromatic-group-containing monomer, the content of the structural unit derived from the styrene-based monomer is preferably 20 mass % or less, more preferably 10 mass % or less, still more preferably 5 mass % or less, and particularly preferably 0 mass % (i.e., a structural unit derived from a styrene-based monomer is not contained), from the viewpoint of providing stability when used for forming self-dispersing polymer particles.

The term "styrene-based monomer" refers to any of styrene, a substituted styrene (such as α-methylstyrene or chlorostyrene), or a styrene macromer containing a polystyrene structural unit.

In the invention, the self-dispersing polymer may include, in addition to the above-described structural unit derived from an aromatic-group-containing monomer, at least one other additional structural unit as a hydrophobic structural unit, as necessary. The monomer forming the additional structural unit is not particularly limited as long as the monomer can copolymerize with the hydrophilic-group-containing monomer and the aromatic-group-containing monomer, and may be a known monomer.

Examples of the monomer forming the additional structural unit (hereinafter sometimes referred to as an "additional copolymerizable monomer") include alkyl (meth)acrylates such as methyl (meth)acrylate, ethyl (meth)acrylate, isopropyl (meth)acrylate, n-propyl (meth)acrylate, n-butyl (meth)acrylate, isobutyl (meth)acrylate, t-butyl (meth)acrylate, hexyl (meth)acrylate, and ethylhexyl (meth)acrylate; dialkylaminoalkyl (meth)acrylates such as dimethylaminoethyl (meth)acrylate; and (meth)acrylamides such as N-hydroxyalkyl (meth)acrylamides (such as N-hydroxymethyl (meth)acrylamide, N-hydroxyethyl (meth)acrylamide, and N-hydroxybutyl (meth)acrylamide) and N-alkoxyalkyl (meth)acrylamides (such as N-methoxymethyl (meth)acrylamide, N-ethoxymethyl (meth)acrylamide, N-(n-, iso)butoxymethyl (meth)acrylamide, N-methoxyethyl (meth)acrylamide, N-ethoxyethyl (meth)acrylamide, and N-(n-, iso)butoxyethyl (meth)acrylamide).

Among them, the additional copolymerizable monomer is preferably at least one (meth)acrylate containing a chain alkyl group having 1 to 8 carbon atoms, more preferably a (meth)acrylate containing a chain alkyl group having 1 to 4 carbon atoms, and particularly preferably methyl (meth)acrylate or ethyl (meth)acrylate, in consideration of the flexibility of the polymer backbone, ease of controlling the glass transition temperature (Tg), and dispersion stability of the self-dispersing polymer. The chain alkyl group refers to an alkyl group having a straight chain or a branched chain.

In the invention, the additional polymerizable monomer may be used singly or in combination of two or more thereof. When the self-dispersing polymer particles include the additional structural unit, the content of the additional structural unit is preferably from 10 to 80 mass %, more preferably from 15 to 75 mass %, and particularly preferably from 20 to 70 mass %. When a combination of two or more monomers for forming additional structural units is used, the total content thereof is preferably within the above range.

When the water-insoluble polymer forming the self-dispersing polymer particles in the invention contains a structural unit derived from an aromatic-group-containing (meth)acrylate monomer (preferably a structural unit derived from phenoxyethyl (meth)acrylate and/or a structural unit derived from benzyl (meth)acrylate), the content of the structural unit as a copolymerization component is preferably from 15 to 80 mass % with respect to the total mass of the self-dispersing polymer particles, from the viewpoint of controlling the hydrophilicity/hydrophobicity of the polymer.

From the viewpoint of controlling the hydrophilicity/hydrophobicity of the polymer, the water-insoluble polymer preferably includes a structural unit derived from an aromatic-group-containing (meth)acrylate monomer at a copolymerization ratio of from 15 to 80 mass %, a structural unit derived from a carboxyl-group-containing monomer, and a structural unit derived from an alkyl-group-containing monomer (preferably a structural unit derived from an alkyl (meth)acrylate), and more preferably includes a structural unit derived from phenoxyethyl (meth)acrylate and/or a structural unit derived from benzyl (meth)acrylate at a copolymerization ratio of from 15 to 80 mass %, a structural unit derived from a carboxyl-group-containing monomer, and a structural unit derived from an alkyl-group-containing monomer (preferably a structural unit derived from (meth)acrylic ester of an alkyl having 1 to 4 carbon atoms); further it is preferable that the acid value of the water-insoluble polymer be from 25 to 100 (mg KOH/g) and the weight average molecular weight of the water-insoluble polymer be from 3000 to 200,000, and it is more preferable that the acid value be from 25 to 95 (mg KOH/g) and the weight average molecular weight be from 5000 to 150,000.

The self-dispersing polymer in the invention may be a random copolymer in which the respective structural units are introduced irregularly or a block copolymer in which the respective structural units are introduced regularly. When the self-dispersing polymer is a block copolymer, the respective structural units may be introduced at any order during the preparation of the block copolymer, and the same structural component may be used two or more times during the preparation of the block copolymer. However, the self-dispersing polymer is preferably a random copolymer in consideration of versatility and productivity.

The molecular weight range of the water-insoluble polymer forming the self-dispersing polymer particles in the invention is preferably from 3000 to 200,000, more preferably from 5000 to 150,000, and still more preferably from 10,000 to 100,000, in terms of weight average molecular weight. When the weight average molecular weight is 3000 or more, the amount of water-soluble component can be effectively set to a small amount. When the weight average molecular weight is 200,000 or less, the self-dispersibility can be improved.

The weight average molecular weight is measured with a gel permeation chromatography (GPC). A GPC instrument, HLC-8020GPC manufactured by Tosoh Corporation is used, is used; the columns (three in number) to be used are TSKgel Super HZM-H, TSKgel SuperHZ4000, and TSKgel SuperHZ200 (all manufactured by Tosoh Corporation, 4.6 mmID×15 cm); and THF (tetrahydrofuran) is used as an eluent. Regarding the GPC conditions, the sample concentration is 0.3 mass %, the flow rate is 0.35 ml/min, the sample injection amount is 10 μl, and the measurement temperature is 40° C. The detection is performed by using an IR detector. The calibration curve is determined from the following eight samples: standard sample TSK STANDARD POLYSTYRENE, F-40, F-20, F-4, F-1, A-5000, A-2500, A-1000, and n-propylbenzene, all manufactured by Tosoh Corporation.

The glass transition point (Tg) of the self-dispersing polymer in the invention is preferably 50° C. or more, and more preferably 80° C. or more, and still more preferably 130° C. or more, and particularly preferably 160° C. or more. When the glass transition temperature is 50° C. or more, the rubbing resistance and anti-blocking property of the image formed using the inkjet recording liquid is improved.

Exemplary compounds B-01 to B-19 are shown below, which are examples of the water-insoluble polymer forming the self-dispersing polymer particles. However, the invention is not limited to thereto. The numbers in the parentheses indicate mass ratios of copolymerization components.

B-01: phenoxyethyl acrylate/methyl methacrylate/acrylic acid copolymer (50/45/5)
B-02: phenoxyethyl acrylate/benzyl methacrylate/isobutyl methacrylate/methacrylic acid copolymer (30/35/29/6)
B-03: phenoxyethyl methacrylate/isobutyl methacrylate/methacrylic acid copolymer (50/44/6)
B-04: phenoxyethyl acrylate/methyl methacrylate/ethyl acrylate/acrylic acid copolymer (30/55/10/5)
B-05: benzyl methacrylate/isobutyl methacrylate/methacrylic acid copolymer (35/59/6)
B-06: styrene/phenoxyethyl acrylate/methyl methacrylate/acrylic acid copolymer (10/50/35/5)
B-07: benzyl acrylate/methyl methacrylate/acrylic acid copolymer (55/40/5)
B-08: phenoxyethyl methacrylate/benzyl acrylate/methacrylic acid copolymer (45/47/8)
B-09: styrene/phenoxyethyl acrylate/butyl methacrylate/acrylic acid copolymer (5/48/40/7)
B-10: benzyl methacrylate/isobutyl methacrylate/cyclohexyl methacrylate/methacrylic acid copolymer (35/30/30/5)
B-11: phenoxyethyl acrylate/methyl methacrylate/butyl acrylate/methacrylic acid copolymer (12/50/30/8)
B-12: benzyl acrylate/isobutyl methacrylate/acrylic acid copolymer (93/2/5)
B-13: styrene/phenoxyethyl methacrylate/butyl acrylate/acrylic acid copolymer (50/5/20/25)
B-14: styrene/butyl acrylate/acrylic acid copolymer (62/35/3)
B-15: methyl methacrylate/phenoxyethyl acrylate/acrylic acid copolymer (45/51/4)
B-16: methyl methacrylate/phenoxyethyl acrylate/acrylic acid copolymer (45/49/6)
B-17: methyl methacrylate/phenoxyethyl acrylate/acrylic acid copolymer (45/48/7)
B-18: methyl methacrylate/phenoxyethyl acrylate/acrylic acid copolymer (45/47/8)
B-19: methyl methacrylate/phenoxyethyl acrylate/acrylic acid copolymer (45/45/10)

The method of producing the water-insoluble polymer forming the self-dispersing polymer particles in the invention is not particularly limited, and may be a method including performing emulsion polymerization in the presence of a polymerizable surfactant so as to covalently bond the surfactant to the water-insoluble polymer or a method including copolymerizing a monomer mixture containing the hydrophilic-group-containing monomer and the aromatic-group-containing monomer by a known polymerization process such as a solution polymerization method or a bulk polymerization method. Among the above polymerization methods, a solution polymerization is preferable, and a solution polymerization method using an organic solvent is more preferable, in consideration of aggregation speed and jetting stability of an inkjet recording liquid containing the self-dispersing polymer particles.

From the viewpoint of aggregation speed, the self-dispersing polymer particles in the invention preferably include a polymer synthesized in an organic solvent, wherein the polymer has carboxyl groups, all or some of the carboxyl groups of the polymer are neutralized (to give an acid value of preferably from 20 to 100), and the polymer is prepared in the form of a polymer dispersion in which water constitutes the continuous phase. In other words, the production of the self-dispersing polymer particles in the invention preferably includes a step of synthesizing a polymer in an organic solvent and a dispersing step of forming an aqueous dispersion in which at least some of the carboxyl group of the polymer are neutralized.

The dispersion step preferably includes the following substeps (1) and (2):

Substep (1): a step of stirring a mixture containing a polymer (water-insoluble polymer), an organic solvent, a neutralizing agent, and an aqueous medium Substep (2): a step of removing the organic solvent from the mixture The substep (1) is preferably a process in which the polymer (water-insoluble polymer) is dissolved in the organic solvent, and then the neutralizing agent and the aqueous medium are gradually added to and mixed with the polymer solution to form a dispersion. When the neutralizing agent and the aqueous medium are added to the water-insoluble polymer solution in which the water-insoluble polymer is dissolved in the organic solvent as in the above process, self-dispersing polymer particles whose diameter is highly stable during storage can be obtained without requiring a strong shearing force.

The method of stirring the mixture is not particularly limited, and may be a method using a disperser such as a method using a generally-used mixing and stirring apparatus and/or, if necessary, at least one of an ultrasonic disperser or a high-pressure homogenizer.

The organic solvent described above is preferably an alcohol solvent, a ketone solvent, or an ether solvent.

Examples of the alcohol solvent include isopropyl alcohol, n-butanol, t-butanol, and ethanol. Examples of the ketone solvent include acetone, methyl ethyl ketone, diethyl ketone, and methyl isobutyl ketone. Examples of the ether solvent include dibutyl ether and dioxane. Among the above solvents, ketone solvents such as methyl ethyl ketone and alcohol solvents such as isopropyl alcohol are preferable. It is also preferable to use isopropyl alcohol and methyl ethyl ketone together for the purpose of making milder the polarity change at the time of phase inversion from an oil phase to an aqueous phase; using the solvents together makes it possible to obtain self-dispersing polymer particles having a very small particle diameter that are free from aggregation precipitation or adhesion between the particles and that have high dispersion stability.

The neutralizing agent is used to neutralize all or some of the dissociative groups of the polymer so as to allow the self-dispersing polymer to get into a stable emulsion or dispersion state in water. When the self-dispersing polymer in the invention has an anionic dissociative group (e.g., a carboxylic group) as a dissociative group, the neutralizing agent to be used may be a basic compound such as an organic amine compound, ammonia, or an alkali metal hydroxide. Examples of the organic amine compound include monomethylamine, dimethylamine, trimethylamine, monoethylamine, diethylamine, triethylamine, monopropylamine, dipropylamine, monoethanolamine, diethanolamine, triethanolamine, N,N-dimethyl-ethanolamine, N,N-diethyl-ethanolamine, 2-dimethylamino-2-methyl-1-propanol, 2-amino-2-methyl-1-propanol, N-methyldiethanolamine, N-ethyldiethanolamine, mono isopropanolamine, diisopropanolamine, and triisopropanolamine. Examples of the alkali metal hydroxide include lithium hydroxide, sodium hydroxide, and potassium hydroxide. Among them, sodium hydroxide, potassium hydroxide, triethylamine, and triethanolamine are preferable from the viewpoint of dispersion stability of the self-dispersing polymer particles in water.

The amount of the basic compound to be used is preferably from 5 to 120 mol %, more preferably from 10 to 110 mol %, and still more preferably from 15 to 100 mol %, with respect to 100 mol % of the dissociative group. When the amount of the basic compound is 15 mol % or more, an effect of stabilizing the dispersion of the particles in water can be obtained. When the amount of the basic compound is 100 mol % or less, an effect of reducing the water-soluble component can be obtained.

In the substep (2), the organic solvent is removed from the dispersion obtained in the substep (1) by a common method such as distillation under reduced pressure, whereby phase inversion into an aqueous system occurs and an aqueous dispersion of the self-dispersing polymer particles are obtained. The organic solvent has substantially been removed from the obtained aqueous dispersion, and the amount of the remaining organic solvent is preferably 0.2 mass % or less, and more preferably 0.1 mass % or less.

The weight average molecular weight of the resin of the resin particles is preferably from 10,000 to 200,000, and more preferably from 100,000 to 200,000.

The average particle diameter of the resin particles (latex particles) is preferably in the range of from 10 nm to 1 μm, more preferably in the range of from 10 nm to 200 nm, still more preferably from 10 nm to 100 nm, and particularly preferably from 10 nm to 50 nm, in terms of volume average particle diameter. When the volume average particle diameter is 10 nm or more, the suitability for production is improved. When the volume average particle diameter is 1 μm or less, storage stability is improved.

The particle diameter distribution of the resin particles is not particularly limited, and may be a broad particle diameter distribution or a mono-dispersed particle diameter distribution. It is possible to use a mixture of two or more types of water-insoluble particles. It is also possible to use a mixture of two or more types of resin particles each having a mono-dispersed particle size distribution.

The average particle diameter and particle diameter distribution of the resin particles is obtained by measuring the diameters of the particles by a dynamic light scattering method using NANOTRAC particle size analyzer UPA-EX150 manufactured by Nikkiso Co., Ltd.

It is possible to use either one type of resin particles (particularly, self-dispersing polymer particles) or a mixture of two or more types of resin particles.

The content of the resin particles in the inkjet recording liquid is preferably from 0.5 to 20 mass %, more preferably from 2 to 20 mass %, and still more preferably from 3 to 15 mass %, with respect to the total mass of the inkjet recording liquid.

Other Components

The inkjet recording liquid of the invention may contain other additives. Examples of other additives include known additives such as an ultraviolet absorber, an anti-fading agent, an antifungal agent, a pH adjuster, an antirust agent, an antioxidant, an emulsion stabilizer, an antiseptic agent, a defoaming agent, a viscosity adjustment agent, a dispersion stabilizer, a chelating agent, and a solid wetting agent.

Examples of the ultraviolet absorber include a benzophenone ultraviolet absorber, a benzotriazole ultraviolet absorber, a salicylate ultraviolet absorber, a cyanoacrylate ultraviolet absorber, and a nickel complex salt ultraviolet absorber.

As anti-fading agents, various organic anti-fading agents and metal complex anti-fading agents can be used. Examples of the organic anti-fading agents include hydroquinones, alkoxyphenols, dialkoxyphenols, phenols, anilines, amines, indans, chromanes, alkoxy anilines, and heterocycles. Examples of the metal complex anti-fading agents include a nickel complex and a zinc complex.

Examples of the antifungal agent include sodium dehydroacetate, sodium benzoate, sodium pyridinethione-1-oxide, ethyl p-hydroxybenzoate, 1,2-benzisothiazoline-3-one, sodium sorbate, and sodium pentachlorophenol. The content of antifungal agent in the inkjet recording liquid is preferably from 0.02 to 1.00 mass %.

The pH adjuster is not specifically limited as long as the pH adjuster can adjust a pH value to a desired value without exerting an adverse influence on an inkjet recording liquid to which the pH adjuster is added. The pH adjuster may be selected appropriately in accordance with the purpose. Examples of the pH adjuster include alcohol amines (such as diethanlol amine, triethanol amine or 2-amino-2-ethyl-1,3-propanediol); alkali metal hydroxides (such as lithium hydroxide, sodium hydroxide or potassium hydroxide); ammonium hydroxides (such as ammonium hydroxide or quaternary ammonium hydroxide); phosphonium hydroxide; and alkali metal carbonates.

Examples of the antirust agent include acid sulfite, sodium thiosulfate, ammonium thiodiglycolate, diisopropyl ammonium nitrite, pentaerythritol tetranitrate, and dicyclohexyl ammonium nitrite.

Examples of the antioxidant include phenolic antioxidants (including hindered phenol antioxidants), amine antioxidants, sulfur antioxidants, and phosphorus antioxidants.

Examples of the chelating agent include sodium ethylenediamine tetraacetate, sodium nitrilotriacetate, sodium hydroxyethyl ethylenediamine triacetate, sodium diethylenetriamine pentaacetate, and sodium uramil diacetate.

Examples of the solid wetting agent, which is an agent wetting a surface of a solid (e.g., a pigment), include saccharides such as glucose, mannose, fructose, ribose, xylose, arabinose, galactose, aldonic acid, glucitol, maltose, cellobiose, lactose, sucrose, trehalose or maltotriose; sugar alcohols; hyaluronic acids; and ureas.

Physical Properties of Inkjet Recording Liquid

The surface tension of the inkjet recording liquid of the invention is preferably from 20 mN/m to 60 mN/m, more preferably from 20 mN/m to 45 mN/m, and still more preferably from 25 mN/m to 40 mN/m. The surface tension may be adjusted to the desired range, for example, by containing a surfactant.

The viscosity of the inkjet recording liquid of the invention at 20° C. is preferably from 1.2 mPa·s to 15.0 mPa·s, more preferably from 2 mPa·s to less than 13 mPa·s, and still more preferably from 2.5 mPa·s to less than 10 mPa·s. The viscosity may be adjusted to the desired range, for example, by modifying the molecular weight and content of the water-soluble organic solvents.

Inkjet Recording Method

The inkjet recording method of the invention includes a process of jetting an inkjet recording liquid to a recording medium to form an image. When the inkjet recording liquid of the invention is used, the occurrence of curling can be effectively suppressed.

Although the recording medium in the invention is not particularly limited as long as the inkjet recording liquid can be applied, from the viewpoint of suppressing the occurrence of curling, the recording medium is preferably plain paper or coated paper.

In a preferable inkjet recording method in the invention, energy is supplied to an inkjet recording liquid to form an image on a known image receiving material such as plain paper, resin coated paper, inkjet paper as those described in JP-A Nos. 8-169172, 8-27693, 2-276670, 7-276789, 9-323475, 62-238783, 10-153989, 10-217473, 10-235995 and 10-217597, a film, electrophotographic common paper, fabrics, glass, metal or ceramics. In addition, as an inkjet recording method applied to the invention, the inkjet recording method described in the paragraphs [0093] to [0105] of JP-A No. 2003-306623 is preferable.

When forming an image, a polymer latex compound may be used together for the purpose of imparting glossiness and water resistance or of improving weather-resistance. The time when the latex compound is added to the image receiving material may be before, after, or simultaneously with application of a colorant. Accordingly, the latex compound may be added to an image receiving paper or added to an ink, or may be used as an independent liquid of the polymer latex. More specifically, methods described in JP-A Nos. 2002-166638, 2002-121440, 2002-154201, 2002-144696 and 2002-080759 can be preferably used.

A preferable example of an image forming method using the inkjet recording liquid of the invention is an inkjet recording method including the following processes:

a first process, being a process of applying a printability-improving liquid composition onto a recording medium;

a second process, being a process of applying an inkjet recording liquid onto the recording medium onto which the liquid composition has been applied; and other additional processes, which are not particularly limited, and may be suitably selected according to the purpose.

Examples of the additional processes include a drying and removing process, and a heating and fixing process. The drying and removing process is not specifically restricted as long as the ink solvent in the inkjet recording liquid that is applied to a recording medium can be dried and removed by the process, and the process may be suitably selected according to the purpose. The heating and fixing process is not specifically restricted as long as latex particles contained in the ink used in the inkjet recording method are fused and fixed in the process, and the process may be suitably selected according to the purpose.

Another example of a preferable image forming system in the invention includes:

a first process, being a process of applying a printability-improving liquid composition onto an intermediate transfer member;

a second process, being a process of applying an inkjet recording liquid onto the intermediate transfer member onto which the liquid composition has been provided;

a third process, being a process of transferring an ink image formed on the intermediate transfer member onto a recording medium; and other additional processes, which are not particularly limited, and may be suitably selected according to the purpose. Examples of the additional processes include a drying and removing process, and a heating and fixing process.

Printability-Improving Liquid Composition

Preferable examples of the inkjet recording method using the inkjet recording liquid of the invention include an inkjet recording method including a process of applying a printability-improving liquid composition onto a recording medium.

Preferable examples of the printability-improving liquid composition include a liquid composition that, when mixed with an ink, causes aggregation by changing the pH of the ink. The pH of the liquid composition is preferably from 1 to 6, more preferably from 2 to 5, and still more preferably from 3 to 5.

Examples of a component of the liquid composition include polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidone carboxylic acid, pyrone carboxylic acid, pyrrole carboxylic acid, furan carboxylic acid, pyridine carboxylic acid, coumalic acid, thiophene carboxylic acid, nicotinic acid, and the derivatives and salts thereof. These compounds may be used singly, or two or more kinds thereof may be used in combination.

A preferable example of the printability-improving liquid composition that can be used in the invention is a process liquid containing a multivalent metal salt or a polyallylamine. Examples of a component in the process liquid include a multivalent metal salt such as a salt of an alkaline earth metal of Group 2A in the periodic table of elements (for example, magnesium or calcium), a salt of a transition metal of Group 3B in the periodic table (for example, lanthanum), a salt of a cation of a Group 3A element in the periodic table (for example, aluminum), or a salt of a lanthanide (for example, neodymium); and polyallylamine and polyallylamine derivatives. Preferable examples thereof include a salt of calcium or magnesium. For the counter-anion for the calcium or magnesium, preferable examples of the salt of calcium or magnesium include a carboxylate (such as a formate, acetate or benzoate), a nitrate, a chloride, and a thiocyanate. The content of the multivalent metal salt in the process liquid is in the range of about 1 mass % to about 10 mass %, preferably about 1.5 mass % to about 7 mass %, and more preferably about 2 mass % to about 6 mass %.

EXAMPLES

Hereinafter, the invention will be described in more detail with reference to examples, but the invention is not limited to the examples. Further, "parts" and "%" are expressed in terms of mass, unless otherwise specified.

Example 1

Preparation of Inkjet Recording Liquid

Preparation of Pigment (Colorant) Dispersion Liquid
Preparation of Polymer Dispersant P-1

Methyl ethyl ketone (88 g) was placed in a 1000 ml three-neck flask equipped with a stirrer and a condenser tube, and heated to 72° C. under a nitrogen atmosphere. Separately, 0.85 g of dimethyl-2,2'-azobisisobutyrate, 60 g of benzyl methacrylate, 10 g of methacrylic acid, and 30 g of methyl methacrylate were dissolved in 50 g of methyl ethyl ketone to form a mixed solution. The solution was added dropwise to the liquid in the flask over three hours. After the dropwise addition was completed, the reaction was further continued for one hour. Then, a solution obtained by dissolving 0.42 g of dimethyl 2,2'-azobisisobutyrate in 2 g of methyl ethyl ketone was added to the reaction solution, and the reaction solution was heated to 78° C. and heated at the temperature for 4 hours. The obtained reaction solution was reprecipitated twice with an excess quantity of hexane, and the precipitated resin was dried, whereby 96 g of dispersant P-1 was obtained.

Subsequently, the composition of the obtained resin was identified with $^1$H-NMR. The weight average molecular weight (Mw) was determined by a GPC method, and found to be 44,600. Furthermore, the acid value of the polymer was obtained in accordance with the method described in JIS Standard (JIS-K0070 (1992), the disclosure of which is incorporated by reference herein), and was found to be 65.2 mg KOH/g.

Preparation of Cyan Dispersion 10 parts by mass of Pigment blue 15:3 (Phthalocyanine Blue A220 (trade name), manufactured by Dainichiseika Color & Chemicals Mfg. Co., Ltd.), 5 parts by mass of the polymer dispersant P-1, 42 parts by mass of methyl ethyl ketone, 5.5 parts of an aqueous solution of NaOH (1 mol/L), and 87.2 parts of ion-exchanged water were mixed, and the mixture was dispersed by a bead mill for 2 to 6 hours using zirconia beads with a diameter of 0.1 mmφ.

Methyl ethyl ketone was removed from the obtained dispersion at 55° C. under reduced pressure, and a part of water was removed, whereby a cyan dispersion liquid with a pigment concentration of 10.2 mass % was obtained.

Thus, as a colorant, the cyan dispersion liquid was prepared.

The ingredients described below were mixed, in the compositional ratio described below, using the colorant (the cyan dispersion liquid) obtained above. The obtained mixture was passed through a membrane filter having pore size of 5 μm, whereby Ink-1 (inkjet recording liquid) was obtained.

Composition of Ink-1

| | |
|---|---|
| Cyan pigment (pigment blue 15:3) | 4% |
| Polymer dispersant P-1 | 2% |
| Diethyleneglycol monoethyl ether (first water-soluble organic solvent) (manufactured by Wako Pure Chemical Industries, Ltd.) | 10% |
| SANNIX (NEWPOL)GP-250 (second water-soluble organic solvent) (trade name, manufactured by Sanyo Chemical Industries, Ltd.) | 5% |
| OLFINE E1010 (surfactant) (trade name, manufactured by Nissin Chemical Industry Co., Ltd.) | 1% |
| Ion-exchanged water | 78% |

Example 2

Ink-2 to Ink-15, Ink-22 and Ink-23 were prepared in the same manner as in Example 1, except that the kind and content amount of the first and second water-soluble organic solvents were changed as shown in Table 1.

Example 3

Preparation of Resin Particle Dispersion A

A mixed solution of 2353 g of JONCRYL 537 (trade name, manufactured by BASF Japan Ltd.; concentration: 45.9%), 1080 g of sodium oleate and 167 g of ion-exchanged water was prepared in a reaction vessel. The obtained mixed solution was centrifuged at 13,000 rpm for 60 minutes and the supernatant liquid recovered.

A part of the collected solution thus obtained was dried in a vacuum at a temperature of 120° C. for 2 hours and the solid content thereof was measured. The solid content of the collected solution (the concentration of the resin particle dispersion) was found to be 31%.

The ingredients described below, in the compositional ratio described below, were mixed to prepare Ink-16 (inkjet recording liquid) containing resin particles, using the cyan dispersion liquid and resin particle dispersion A obtained above.

Composition of Ink-16

| | |
|---|---|
| Cyan pigment (pigment blue 15:3) | 4% |
| Polymer dispersant P-1 | 2% |
| Resin particle dispersion A (solid content) | 8% |
| Diethyleneglycol monoethyl ether (first water-soluble organic solvent) (manufactured by Wako Pure Chemical Industries, Ltd.) | 10% |
| SANNIX (NEWPOL) GP-250 (second water-soluble organic solvent) (trade name, manufactured by Sanyo Chemical Industries, Ltd.) | 5% |
| OLFINE E1010 (surfactant) (trade name, manufactured by Nissin Chemical Industry Co., Ltd.) | 1% |
| Ion-exchange water | 70% |

Example 4

Ink-17 to Ink-21 containing the polymer resin particle dispersion A were prepared in the same manner as in Example 3, except that the kind and content amount of the first and second water-soluble organic solvents were changed as shown in Table 1.

Comparative Example 1

Ink-24 to Ink-36 were prepared in the same manner as in Example 1, except that the kind and content amount of the first and second water-soluble organic solvents were changed as shown in Table 1.

Comparative Example 2

Ink-37 to Ink-39 containing resin particles were prepared in the same manner as in Example 3, except that the kind and content amount of the first and second water-soluble organic solvents were changed as shown in Table 1.

TABLE 1

| | (a) First water-soluble organic solvent | | | | (b) Second water-soluble organic solvent | | | | Total content of solvent (%) | Resin Particle | Evaluation | | | | |
|---|---|---|---|---|---|---|---|---|---|---|---|---|---|---|---|---|
| Ink | Solvent | MW | SP value | Content (%) | Solvent | MW | SP value | Content (%) | a:b | | | Curl Property (1) | Curl Property (2) | Storage Stability | Jetting Stability | Notes |
| 1 | DEGmEE | 134 | 22.4 | 10.0 | GP-250 | 250 | 26.4 | 5.0 | 2:1 | 15.0 | — | A | A | A | A | Invention |
| 2 | DEGmEE | 134 | 22.4 | 7.5 | GP-250 | 250 | 26.4 | 7.5 | 1:1 | 15.0 | — | A | A | A | A | Invention |
| 3 | DEGmEE | 134 | 22.4 | 5.0 | GP-250 | 250 | 26.4 | 10.0 | 2:1 | 15.0 | — | A | A | A | A | Invention |
| 4 | DEGmEE | 134 | 22.4 | 9.0 | GP-250 | 250 | 26.4 | 18.0 | 1:2 | 27.0 | — | A | A | A | B | Invention |
| 5 | DEGmEE | 134 | 22.4 | 7.0 | GP-250 | 250 | 26.4 | 14.0 | 1:2 | 21.0 | — | A | A | A | A | Invention |
| 6 | DEGmBE | 162 | 21.5 | 7.0 | GP-250 | 250 | 26.4 | 14.0 | 1:2 | 21.0 | — | A | A | A | A | Invention |

TABLE 1-continued

| | (a) First water-soluble organic solvent | | | | (b) Second water-soluble organic solvent | | | | | Total content of solvent (%) | Resin Particle | Evaluation | | | | |
|---|---|---|---|---|---|---|---|---|---|---|---|---|---|---|---|---|
| Ink | Solvent | MW | SP value | Content (%) | Solvent | MW | SP value | Content (%) | a:b | | | Curl Property (1) | Curl Property (2) | Storage Stability | Jetting Stability | Notes |
| 7 | TEGmBE | 206 | 21.1 | 7.0 | GP-250 | 250 | 26.4 | 14.0 | 1:2 | 21.0 | — | A | A | A | A | Invention |
| 8 | PGmEE | 104 | 22.3 | 7.0 | GP-250 | 250 | 26.4 | 14.0 | 1:2 | 21.0 | — | A | A | A | A | Invention |
| 9 | DPG | 134 | 27.1 | 7.0 | GP-250 | 250 | 26.4 | 14.0 | 1:2 | 21.0 | — | A | A | A | A | Invention |
| 10 | DPGmME | 148 | 21.3 | 7.0 | GP-250 | 250 | 26.4 | 14.0 | 1:2 | 21.0 | — | A | A | A | A | Invention |
| 11 | DEGmEE | 134 | 22.4 | 7.0 | GP-400 | 400 | 23.2 | 14.0 | 1:2 | 21.0 | — | A | A | A | B | Invention |
| 12 | DEGmBE | 162 | 21.5 | 7.0 | GP-400 | 400 | 23.2 | 14.0 | 1:2 | 21.0 | — | A | A | A | B | Invention |
| 13 | DEGmEE | 134 | 22.4 | 7.0 | 50HB-260 | 880 | 19.0 | 14.0 | 1:2 | 21.0 | — | A | A | A | B | Invention |
| 14 | DEGmEE | 134 | 22.4 | 7.0 | 50HB-55 | 240 | 20.1 | 14.0 | 1:2 | 21.0 | — | A | A | A | B | Invention |
| 15 | DEGmBE | 162 | 21.5 | 7.0 | 50HB-55 | 240 | 20.1 | 14.0 | 1:2 | 21.0 | — | A | A | A | B | Invention |
| 16 | DEGmEE | 134 | 22.4 | 10.0 | GP-250 | 250 | 26.4 | 5.0 | 2:1 | 15.0 | A | A | A | B | B | Invention |
| 17 | DEGmEE | 134 | 22.4 | 7.5 | GP-250 | 250 | 26.4 | 7.5 | 1:1 | 15.0 | A | A | A | B | B | Invention |
| 18 | DEGmEE | 134 | 22.4 | 5.0 | GP-250 | 250 | 26.4 | 10.0 | 2:1 | 15.0 | A | A | A | B | B | Invention |
| 19 | DEGmEE | 134 | 22.4 | 6.0 | GP-250 | 250 | 26.4 | 12.0 | 1:2 | 18.0 | A | A | A | B | B | Invention |
| 20 | DEGmBE | 162 | 21.5 | 6.0 | GP-250 | 250 | 26.4 | 12.0 | 1:2 | 18.0 | A | A | A | B | B | Invention |
| 21 | TEGmBE | 206 | 21.1 | 6.0 | GP-250 | 250 | 26.4 | 12.0 | 1:2 | 18.0 | A | A | A | B | B | Invention |
| 22 | DEGmEE | 134 | 22.4 | 5.3 | GP-250 | 250 | 26.4 | 15.7 | 3:1 | 21.0 | — | C | B | A | B | Invention |
| 23 | DEGmEE | 134 | 22.4 | 15.7 | GP-250 | 250 | 26.4 | 5.3 | 1:3 | 21.0 | — | C | B | A | B | Invention |
| 24 | DEGmEE | 134 | 22.4 | 40.0 | — | — | — | — | 1:0 | 40.0 | — | A | A | D | D | Comp. Ex. |
| 25 | DEGmBE | 162 | 21.5 | 40.0 | — | — | — | — | 1:0 | 40.0 | — | A | A | D | D | Comp. Ex. |
| 26 | TEGmBE | 206 | 21.1 | 40.0 | — | — | — | — | 1:0 | 40.0 | — | A | A | D | D | Comp. Ex. |
| 27 | DPG | 134 | 27.1 | 40.0 | — | — | — | — | 1:0 | 40.0 | — | A | A | D | D | Comp. Ex. |
| 28 | Glycerin | 92 | 41.0 | 40.0 | — | — | — | — | 1:0 | 40.0 | — | D | D | B | D | Comp. Ex. |
| 29 | DEG | 106 | 30.6 | 40.0 | — | — | — | — | 1:0 | 40.0 | — | D | D | D | D | Comp. Ex. |
| 30 | TEG | 150 | 27.8 | 40.0 | — | — | — | — | 1:0 | 40.0 | — | D | D | D | D | Comp. Ex. |
| 31 | TEG | 150 | 27.8 | 7.0 | GP-250 | 250 | 26.4 | 14.0 | 1:2 | 21.0 | — | C | C | A | B | Comp. Ex. |
| 32 | 50HB-55 | 240 | 20.1 | 14.0 | GP-250 | 250 | 26.4 | 7.0 | 2:1 | 21.0 | — | B | A | C | D | Comp. Ex. |
| 33 | PGmME | 90 | 23.1 | 14.0 | GP-250 | 250 | 26.4 | 7.0 | 2:1 | 21.0 | — | B | A | D | C | Comp. Ex. |
| 34 | DEGmEE | 134 | 22.4 | 7.0 | TEGmBE | 206 | 21.1 | 14.0 | 1:2 | 21.0 | — | B | A | D | D | Comp. Ex. |
| 35 | — | — | — | — | GP-250 | 250 | 26.4 | 21.0 | 0:1 | 21.0 | — | C | C | A | B | Comp. Ex. |
| 36 | DEGmEE | 134 | 22.4 | 21.0 | — | — | — | — | 1:0 | 21.0 | — | C | C | B | A | Comp. Ex. |
| 37 | Glycerin | 92 | 41.0 | 40.0 | — | — | — | — | 1:0 | 40.0 | A | D | D | C | D | Comp. Ex. |
| 38 | 50HB-55 | 240 | 20.1 | 14.0 | GP-250 | 250 | 26.4 | 7.0 | 2:1 | 21.0 | A | B | B | D | D | Comp. Ex. |
| 39 | — | — | — | — | GP-250 | 250 | 26.4 | 21.0 | 0:1 | 21.0 | A | C | B | B | B | Comp. Ex. |

The meaning of the abbreviations in Table 1 is as follows:
MW: molecular weight
Comp. Ex.: Comparative Example
DEGmEE: diethyleneglycol monoethyl ether
DEGmBE: diethyleneglycol monobutyl ether
TEGmBE: triethyleneglycol monobutyl ether
PGmEE: propyleneglycol monoethyl ether
DPG: dipropyleneglycol
DPGmME: dipropyleneglycol monomethyl ether
DEGmBE: diethyleneglycol monobutyl ether
DEG: diethyleneglycol
TEG: triethyleneglycol
50HB-55: polyoxyethylene polyoxypropylene butyl ether NEWPOL 50HB-55 (tradename, manufactured by Sanyo Chemical Industries Ltd.)
PGmME: propyleneglycol monomethyl ether
50HB-260: polyoxyethylene polyoxypropylene butyl ether NEWPOL 50HB-260 (tradename, manufactured by Sanyo Chemical Industries Ltd.)
GP-250: polyoxypropylene glyceryl ether SANNIX (NEWPOL)GP-250 (trade name, manufactured by Sanyo Chemical Industries, Ltd.)
GP-400: polyoxypropylene glyceryl ether NEWPOL GP-400 (trade name, manufactured by Sanyo Chemical Industries, Ltd.)
Evaluation
Curl Property (1)
Strips of sample paper each having a size of 5 mm×50 mm were prepared by cutting TOKUHISHI ART N paper (trade name, manufactured by Mitsubishi Paper Mills, Ltd.) (basis weight: 84.9 g/m$^2$) such that when any of the strips curled, the curling direction would be the length direction of the strip.

The inkjet recording liquids prepared above (Ink-1 to Ink-39) were applied onto respectively different sample paper strips using an application bar in a coating amount of 4 g/m$^2$. Then, Curvature C of each sample paper strip was measured in the following manner. The evaluation results of Curl property (1) in accordance with the following criteria are shown in Table 1.

Method of Measuring Curvature
Curvature C of the sample on which the inkjet recording liquid had been applied was measured under conditions of a temperature of 25° C. and a relative humidity of 50%. Here, the curl of the sample was regarded as an arc of a circle with a radius of R, and the curl value was calculated according to the equation, $C=1/R(m)$.

Evaluation Criteria
A: Curvature C ten minutes after ink application did not exceed 20
B: Curvature C ten minutes after ink application exceeded 20, but Curvature C one day after ink application did not exceed 20
C: Curvature C one day after ink application exceeded 20, but Curvature C seven days after ink application did not exceed 20
D: Curvature C after 7 days of ink application exceeded 20

Curl Property (2)
A colorless ink composition (a printability-improving liquid composition) was applied onto a recording medium using an application bar in an amount of 1 g/m$^2$, and then the recording medium was dried for 4 seconds by hot air at 100°

C. As the recording medium, TOKUHISHI ART double-sided N paper (trade name, manufactured by Mitsubishi Paper Mills, Ltd.) (basis weight: 104.7 g/m²) was used. The colorless ink composition was prepared by mixing the following ingredients.

Composition of Colorless Ink

| | |
|---|---|
| Critic acid | 15 g |
| OLFINE E1010 (trade name, manufactured by Nissin Chemical Industry Co., Ltd.) | 1 g |
| Ion-exchange water | 84 g |

Each of the obtained inkjet recording inks (Ink-1 to Ink-39) was evaluated as follows. Using the same evaluation equipment as that used in the below-mentioned evaluation of jetting property, the inkjet recording ink was used to print a solid image on the recording medium at an ink coating amount of 5 g/m². Then, the recording medium was dried for 3 seconds by hot air at 100° C., and was left for 1 hour. A strip having a size of 5 mm×50 mm was then cut from the recording medium such that the length of 50 mm corresponded to the curling direction, and the strip was allowed to stand at a temperature of 25° C. and a relative humidity of 50%. Then, Curvature C of the recording medium was measured according to the same criteria as those used for the evaluation of curl property (1) described above.

Since the evaluation of curl property (2) involves image forming with an actual printer, the evaluation of curl property (2) is regarded as an evaluation under conditions that are closer to actual inkjet recording than the evaluation of curl property (1).

Storage Stability

Each of the obtained inkjet recording liquids (Ink-1 to Ink-39) was evaluated as follows. The temperature of the inkjet recording liquid was adjusted to 25° C. The viscosity of the undiluted ink liquid at 25° C. was measured with an vibratory viscometer (trade name: DV-II+VISCOMETER, manufactured by BROOKFIELD) under conditions of a temperature of 25° C. and a relative humidity of 50% on a cone plate (φ 35 mm). Measurement data were obtained in a torque range of from 20% to 90% and a revolution number range of from 0.5 to 100 rpm, and the average value of the measurement data was used as a measured viscosity. The measured viscosity immediately after the preparation of the inkjet recording liquid was defined as ink viscosity 1.

Subsequently, a part of the inkjet recording liquid was placed in a sample bottle made of glass, and the bottle was sealed and left (stored) at 60° C. for 2 weeks. Thereafter, the viscosity after storage was measured by the same method as the above, and the obtained value was defined as ink viscosity 2. Simultaneously, the state of the ink liquid was visually inspected.

The ratio of change in the ink viscosity measured before and after storage was calculated by the following formula:

The ratio of change in the ink viscosity=100−((ink viscosity 2/ink viscosity 1)×100)

Ink storage stability was evaluated in accordance with the following evaluation criteria, also considering the result of visual inspection after storage.

Evaluation Criteria

A: The rate of change in the ink viscosity was less than ±15%, and a change in the ink recording liquid was not observed by visual inspection B: The rate of change in the ink viscosity was ±15% or more but less than ±30%, and a change in the ink recording liquid was not observed by visual inspection C: The rate of change in the ink viscosity was ±30% or more but less than ±50%, and a change in the ink recording liquid was not observed by visual inspection D: The rate of change in the ink viscosity was ±50% or more, or separation or gelation of the ink recording liquid was observed by visual inspection Jetting Stability The jetting stability of each of the obtained inkjet recording liquids (Ink 1 to Ink-39) was evaluated in the following manner. The evaluation conditions were a temperature of 25° C. and a relative humidity of 50%.

A DIMATIX MATERIAL PRINTER DMP-2831 (trade name, manufactured by Fujifilm Dimatix Inc.) equipped with a 10 pl ejection cartridge DIMATIX MATERIAL CARTRIDGE DMC-11610 (trade name, manufactured by Fujifilm Dimatix Inc.) was used as evaluation equipment, and the ink was evaluated with regard to the following evaluation items (i) to (iii). The evaluation results of jetting stability in accordance with the following criteria are shown in Table 1.

Here, the ink cartridge had been modified to have a capacity of 100 ml for accommodating the liquid to be filled therein. As a recording medium, TOKUHISHI ART N paper (trade name, manufactured by Mitsubishi Paper Mills, Ltd.) (basis weight: 84.9 g/m²) that had been cut into a size of 5 mm×50 mm in the same manner as the above was used.

Evaluation Items (i) positive if no image unevenness was observed (ii) positive if, after ink is ejected continuously for one minute and then the ejection nozzles are left uncapped for 30 minutes, the ink jetting ratio was 90% or more (that is, the ratio of ink jetting failure was less than 10%), (iii) positive if, after 60-minute continuous ink ejection, the ink jetting ratio was 90% or more (that is, the ratio of ink jetting failure was less than 10%)

Evaluation Criteria

A: All of the items (i) to (iii) were positive

B: Only items (i) and (ii) were positive

C: Only item (i) was positive

D: None of the items (i) to (iii) was positive

As shown in Table 1, it was found that the inkjet recording liquid of the invention exhibits excellent curl-suppression effects. It is also found that the ink storage stability and jetting stability of the inkjet recording liquid of the invention are excellent.

Example 5

Ink-101 to Ink-110 were prepared in the same manner as in Example 1, except that the kind and content amount of the first and second water-soluble organic solvents were changed as shown in Table 2. In Table 2, the total content of the first and second water-soluble organic solvents with respect to the total inkjet recording liquid is referred to as "Content of the specific solvents (%) (with respect to the ink)", and the total content of the first and second water-soluble organic solvents with respect to the total water-soluble organic solvent is referred to as "The content of the specific solvents (%) (with respect to the total solvent)".

Example 6

Ink-111 to Ink-112 were prepared in the same manner as in Example 3, except that the kind and content amount of the first and second water-soluble organic solvents were changed as shown in Table 2.

Example 7

Ink-113 to Ink-116 were prepared in the same manner as in Example 3, except that the following resin particle dispersion B was used in place of resin particle dispersion A and that the kind and content amount of the first and second water-soluble organic solvents were changed as shown in Table 2.

Preparation of Resin Particle Dispersion B

Methyl ethyl ketone (360.0 g) was placed in a 2000 ml three-neck flask equipped with a stirrer, a thermometer, a reflux condenser tube and nitrogen gas inlet tube, and heated to 75° C. under a nitrogen atmosphere. Separately, a mixed solution of 180.0 g of phenoxyethyl acrylate, 162.0 g of methyl methacrylate, 18.0 g of acrylic acid, 72 g of methyl ethyl ketone, and 1.44 g of V-601 (trade name, manufactured by Wako Pure Chemical Industries, Ltd.) was prepared. The mixed solution was added dropwise to the liquid in the flask at a constant speed over two hours while the temperature inside the reaction container (flask) was maintained at 75° C. After the dropwise addition was completed, a solution obtained by dissolving 0.72 g of V-601 (trade name, manufactured by Wako Pure Chemical Industries, Ltd.) in 36.0 g of methyl ethyl ketone was added to the mixed solution, and stirred at 75° C. for 2 hours. Subsequently, a solution obtained by dissolving 0.72 g of V-601 (trade name, manufactured by Wako Pure Chemical Industries, Ltd.) in 36.0 g of isopropanol was further added to the solution, and the solution was stirred at 75° C. for 2 hours. Then, the solution was heated to 85° C., and stirred at this temperature for another 2 hours, whereby a co-polymer solution was obtained.

The weight average molecular weight (Mw) of the obtained co-polymer was determined by measuring the molecular weight by gel permeation chromatography (GPC) using columns of TSKgel SuperHZM-H, TSKgel SuperHZ4000 and TSKgel SuperHZ200 (trade names, manufactured by Tosoh Corporation) and converting the measured value using polystyrene as a reference material. The obtained weight average molecular weight (Mw) of the co-polymer was 64,000. Furthermore, the acid value of the co-polymer was obtained in accordance with the method described in JIS Standard (JIS-K0070 (1992), the disclosure of which is incorporated by reference herein), and was found to be 38.9 mg KOH/g.

Then, 668.3 g of the obtained co-polymer solution, 388.3 g of isopropanol and 145.7 ml of an aqueous solution of NaOH (1N) were mixed in a reaction vessel, and the temperature inside the reaction vessel was elevated to 80° C. Subsequently, 720.1 g of distilled water was added dropwise to the mixture in the vessel at a rate of 20 ml/min to disperse the co-polymer in water. The reaction vessel was sequentially kept at 80° C. for 2 hours, 85° C. for 2 hours and 90° C. for 2 hours under atmospheric pressure, and was depressurized to distill away a total of 913.7 g of isopropanol, methyl ethyl ketone and distilled water, whereby an aqueous dispersion (emulsion) of self-dispersing polymer particles B was obtained, the aqueous dispersion having a solid content of 28.0%.

Comparative Example 3

Ink-117 to Ink-120 containing resin particles were prepared in the same manner as in Example 7, except that the kind and content amount of the first and second water-soluble organic solvents were changed as shown in Table 2.

Evaluation

The curl property (2), storage stability and jetting stability of Ink-101 to Ink-120 obtained above were evaluated. The results are shown in Table 2.

TABLE 2

| | (a) First water-soluble organic solvent | | | | (b) Second water-soluble organic solvent | | | | other additional water-soluble organic solvent | | | |
|---|---|---|---|---|---|---|---|---|---|---|---|---|
| Ink | Solvent | MW | SP value | Content (%) | Solvent | MW | SP value | Content (%) | Solvent | MW | SP value | Content (%) |
| 101 | DEGmEE | 134 | 22.4 | 4.0 | GP-250 | 250 | 26.4 | 12.0 | — | — | — | — |
| 102 | DEGmEE | 134 | 22.4 | 5.0 | GP-250 | 250 | 26.4 | 10.0 | — | — | — | — |
| 103 | DEGmEE | 134 | 22.4 | 10.0 | GP-250 | 250 | 26.4 | 5.0 | — | — | — | — |
| 104 | DEGmEE | 134 | 22.4 | 12.0 | GP-250 | 250 | 26.4 | 4.0 | — | — | — | — |
| 105 | DEGmEE | 134 | 22.4 | 14.0 | GP-250 | 250 | 26.4 | 14.0 | — | — | — | — |
| 106 | TPGmME | 206 | 20.4 | 18.0 | GP-250 | 250 | 26.4 | 9.0 | — | — | — | — |
| 107 | TPGmME | 206 | 20.4 | 18.0 | SC-P400 | 400 | 26.1 | 9.0 | — | — | — | — |
| 108 | TPGmME | 206 | 20.4 | 12.0 | SC-E2000 | 2000 | 21.0 | 6.0 | — | — | — | — |
| 109 | TEGmBE | 206 | 21.1 | 14.0 | GP-250 | 250 | 26.4 | 14.0 | — | — | — | — |
| 110 | DEGmEE | 134 | 22.4 | 8.0 | GP-250 | 250 | 26.4 | 8.0 | Glycerin | 92 | 33.5 | 7.0 |
| 111 | DEGmEE | 134 | 22.4 | 9.0 | GP-250 | 250 | 26.4 | 9.0 | — | — | — | — |
| 112 | TPGmME | 206 | 20.4 | 9.0 | GP-250 | 250 | 26.4 | 9.0 | — | — | — | — |
| 113 | DEGmEE | 134 | 22.4 | 5.0 | GP-250 | 250 | 26.4 | 10.0 | — | — | — | — |
| 114 | TPGmME | 206 | 20.4 | 12.0 | GP-250 | 250 | 26.4 | 6.0 | — | — | — | — |
| 115 | TPGmME | 206 | 20.4 | 15.0 | GP-250 | 250 | 26.4 | 5.0 | — | — | — | — |
| 116 | TPGmME | 206 | 20.4 | 18.0 | SC-P750 | 750 | 22.7 | 9.0 | — | — | — | — |
| 117 | DEGmEE | 134 | 22.4 | 17.0 | GP-250 | 250 | 26.4 | 17.0 | — | — | — | — |
| 118 | DEGmEE | 134 | 22.4 | 4.0 | GP-250 | 250 | 26.4 | 16.0 | — | — | — | — |
| 119 | DEGmEE | 134 | 22.4 | 16.0 | GP-250 | 250 | 26.4 | 4.0 | — | — | — | — |
| 120 | DEGmEE | 134 | 22.4 | 8.0 | GP-250 | 250 | 26.4 | 8.0 | Glycerin | 92 | 33.5 | 7.0 |

TABLE 2-continued

| Ink | a:b | Specific solvents (%)/total solvent | Specific solvents (%)/ink | Resin Particle | Curl Property (2) | Storage Stability | Jetting Stability | Notes |
|---|---|---|---|---|---|---|---|---|
| 101 | 1:3 | 100.0 | 16.0 | — | A | A | A | Invention |
| 102 | 1:2 | 100.0 | 15.0 | — | A | A | A | Invention |
| 103 | 2:1 | 100.0 | 15.0 | — | A | A | A | Invention |
| 104 | 3:1 | 100.0 | 16.0 | — | B | A | A | Invention |
| 105 | 1:1 | 100.0 | 28.0 | — | A | B | B | Invention |
| 106 | 2:1 | 100.0 | 27.0 | — | A | B | B | Invention |
| 107 | 2:1 | 100.0 | 27.0 | — | A | B | B | Invention |
| 108 | 2:1 | 100.0 | 18.0 | — | A | A | A | Invention |
| 109 | 1:1 | 100.0 | 28.0 | — | A | B | B | Invention |
| 110 | 1:1 | 70.0 | 16.0 | — | A | A | A | Invention |
| 111 | 1:1 | 100.0 | 18.0 | A | A | B | B | Invention |
| 112 | 1:1 | 100.0 | 18.0 | A | A | B | B | Invention |
| 113 | 1:2 | 100.0 | 15.0 | B | A | A | A | Invention |
| 114 | 2:1 | 100.0 | 18.0 | B | A | A | A | Invention |
| 115 | 3:1 | 100.0 | 20.0 | B | B | A | B | Invention |
| 116 | 2:1 | 100.0 | 27.0 | B | A | B | B | Invention |
| 117 | 1:1 | 100.0 | 34.0 | B | A | D | C | Comp. Ex. |
| 118 | 4:1 | 100.0 | 20.0 | B | C | A | B | Comp. Ex. |
| 119 | 4:1 | 100.0 | 20.0 | B | C | A | B | Comp. Ex. |
| 120 | 1:1 | 70.0 | 16.0 | B | C | A | B | Comp. Ex. |

The meaning of the abbreviations in Table 2 is as follows:
MW: molecular weight
Comp. Ex.: Comparative Example
DEGmEE: diethyleneglycol monoethyl ether
TPGmME: tripropyleneglycol monomethyl ether
TEGmBE: triethyleneglycol monobutyl ether
GP-250: polyoxypropylene glyceryl ether SANNIX (NEW-POL)GP-250 (trade name, manufactured by Sanyo Chemical Industries, Ltd.)
SC-P400: polyoxypropylene diglyceryl ether (trade name, manufactured by Sakamoto Yakuhin Co. Ltd.)
SC-E2000: polyoxyethylene diglyceryl ether (trade name, manufactured by Sakamoto Yakuhin Co. Ltd.)
SC-P750: polyoxypropylene diglyceryl ether (trade name, manufactured by Sakamoto Yakuhin Co. Ltd.)
Specific solvents (%)/total solvent: Content of the specific solvents (%) with respect to the total solvent
Specific solvents (%)/ink: Content of the specific solvents (%) with respect to the ink As shown in Table 2, it was found that the inkjet recording liquid of the invention exhibits excellent curl-suppression effects. It is also found that the ink storage stability and jetting stability of the inkjet recording liquid of the invention are excellent.

According to the invention, an inkjet recording liquid having an excellent storage stability and jetting stability may be obtained, with which curl of a recording medium after ink is applied onto the recording medium can be suppressed.

Furthermore, according to the invention, an image forming method using the inkjet recording liquid is provided, in which curl of a recording medium after the ink is applied onto a recording medium can be suppressed.

All publications, patent applications, and technical standards mentioned in this specification are herein incorporated by reference to the same extent as if such individual publication, patent application, or technical standard was specifically and individually indicated to be incorporated by reference.

What is claimed is:

1. An inkjet recording liquid comprising: water; a colorant; a first water-soluble organic solvent having a structure represented by the following Formula (1), an SP value of 27.5 or less, and a molecular weight of 100 to 210; and a second water-soluble organic solvent having a structure represented by the following Formula (2), an SP value of 27.5 or less, and a molecular weight of 240 to 2000, wherein the mass ratio of the content of the first water-soluble organic solvent to the content of the second water-soluble organic solvent is from 1:3 to 3:1:

$$R^1\text{-}(A^1)_n\text{-}OH \quad \text{Formula (1)}$$

$$R^2\text{-}(A^2)_m\text{-}OH \quad \text{Formula (2)}$$

wherein, in Formulae (1) and (2), $R^1$ represents a hydrogen atom or an alkyl group having 1 to 4 carbon atoms, each $A^1$ independently represents an ethyleneoxy group or a propyleneoxy group, n represents an integer from 1 to 3, $R^2$ represents a hydrogen atom, an alkyl group having 1 to 4 carbon atoms, or a group derived from a sugar alcohol having 3 to 12 carbon atoms, each $A^2$ independently represents an ethyleneoxy group or a propyleneoxy group, and m represents an integer from 3 to 40; and wherein the second water-soluble organic solvent is at least one selected from polyoxypropylene glyceryl ether having 3 to 9 propyleneoxy groups or polyoxyethylene polyoxypropylene butyl ether in which the total number of ethyleneoxy groups and propyleneoxy groups is from 3 to 20, wherein the total content of the first and second water-soluble organic solvents is 90 mass % or more with respect to the total mass of water-soluble organic solvent.

2. The inkjet recording liquid of claim 1, wherein the first water-soluble organic solvent is at least one selected from propyleneglycol monoethyl ether, diethyleneglycol monoethyl ether, diethyleneglycol monobutyl ether, triethyleneglycol monobutyl ether, dipropyleneglycol, dipropyleneglycol monomethyl ether, or tripropyleneglycol monomethylether, and the second water-soluble organic solvent is at least one selected from polyoxypropylene glyceryl ether having 3 to 9 propyleneoxy groups or polyoxyethylene polyoxypropylene butyl ether in which the total number of ethyleneoxy groups and propyleneoxy groups is from 3 to 20.

3. The inkjet recording liquid of claim 1, wherein the total content of the first and second water-soluble organic solvents is from 5 mass % to 30 mass % with respect to the total mass of the inkjet recording liquid.

4. The inkjet recording liquid of claim 1, wherein the total content of water-soluble organic solvent having an SP value of 27.5 or less is 70 mass % or more with respect to the total mass of water-soluble organic solvent.

5. The inkjet recording liquid of claim 1, further comprising a third water-soluble organic solvent.

6. The inkjet recording liquid of claim 1, wherein the content of the colorant is from 0.1 mass % to 15 mass % with respect to the total mass of the inkjet recording liquid.

7. The inkjet recording liquid according to claim 1, wherein the colorant is a pigment dispersed by a phase inversion emulsification method.

8. The inkjet recording liquid of claim 1, further comprising a resin particle.

9. The inkjet recording liquid of claim 8, wherein the content of a solid component comprising the resin particle is from 0.5 mass % to 20 mass % with respect to the total mass of the inkjet recording liquid.

10. An inkjet recording method, comprising jetting the inkjet recording liquid according of claim 1 onto a recording medium to form an image, further comprising applying a printability-improving liquid composition onto a recording medium.

11. The inkjet recording method of claim 10, wherein the printability-improving liquid composition comprises a multivalent metal salt.

12. The inkjet recording method of claim 10, wherein the recording medium is plain paper or coated paper.

* * * * *